United States Patent
Telfer et al.

(10) Patent No.: US 9,537,801 B1
(45) Date of Patent: Jan. 3, 2017

(54) DISTRIBUTED PACKET ORDERING SYSTEM HAVING SEPARATE WORKER AND OUTPUT PROCESSORS

(71) Applicant: Netronome Systems, Inc., Santa Clara, CA (US)

(72) Inventors: Christopher A. Telfer, Windber, PA (US); Jan Christoffel du Toit, Centurion (ZA)

(73) Assignee: Netronome Systems, Inc., Santa Clara, CA (US)

( * ) Notice: Subject to any disclaimer, the term of this patent is extended or adjusted under 35 U.S.C. 154(b) by 145 days.

(21) Appl. No.: 14/611,224

(22) Filed: Jan. 31, 2015

(51) Int. Cl.
| | |
|---|---|
| *H04L 12/861* | (2013.01) |
| *H04L 29/06* | (2006.01) |
| *H04L 12/863* | (2013.01) |
| *H04L 12/859* | (2013.01) |

(52) U.S. Cl.
CPC ....... *H04L 49/9057* (2013.01); *H04L 47/2475* (2013.01); *H04L 47/625* (2013.01); *H04L 69/22* (2013.01)

(58) Field of Classification Search
CPC ........... H04L 29/06095; H04L 29/0653; H04L 45/74; H04L 49/3009; H04L 49/309
See application file for complete search history.

(56) References Cited

U.S. PATENT DOCUMENTS

| | | | |
|---|---|---|---|
| 2006/0056406 A1* | 3/2006 | Bouchard | H04L 12/56 370/389 |
| 2007/0079106 A1* | 4/2007 | Davis | G06F 12/1018 711/203 |
| 2008/0162800 A1* | 7/2008 | Takashige | G06F 9/5077 711/104 |
| 2010/0146222 A1* | 6/2010 | Cox | G06F 12/1081 711/154 |
| 2012/0093160 A1* | 4/2012 | Tonsing | H04L 12/5602 370/392 |
| 2013/0219091 A1* | 8/2013 | Stark | H04L 45/50 710/104 |

* cited by examiner

*Primary Examiner* — Charles C Jiang
*Assistant Examiner* — Kyaw Z Soe
(74) *Attorney, Agent, or Firm* — Imperium Patent Works LLP; T. Lester Wallace; Mark D. Marrello

(57) ABSTRACT

An Island-Based Network Flow Processor (IB-NFP) receives packets of many flows, and classifies each packet as belonging to one of a plurality of ordering contexts. As packets of an ordering context flow through the IB-NFP they are distributed to a set of Worker Processors (WPs). Each packet is processed by one WP, but multiple WPs are typically operating on packets of the ordering context at the same time. The ordering system handles releasing packets from the WPs to set of Output Processors (OP) in the correct order, even though WPs may complete their processing in an out-of-order fashion. One OP is responsible for generating "transmit commands" for packets of the ordering context. This OP generates a transmit command in the correct format as required by the particular egress destination circuit through which the packet will exit the IB-NFP. This architecture reduces code space, and facilitates good usage of processing resources.

20 Claims, 22 Drawing Sheets

EXAMPLE OPERATION OF THE ORDERING SYSTEM

| WIDTH | DESCRIPTION |
|---|---|
| 6-BITS | BUFFER POOL NUMBER TO USE. |
| 32-BITS | SEQUENCE NUMBER IN A SET OF FLOWS. IN THE CASE OF THE INGRESS NBI BEING THE SOURCE ISLAND, THE LOWER ORDER 16 BITS OF THIS FIELD CONTAIN THE 16-BIT "INPUT SEQUENCE NUMBER" AS GENERATED BY ONE OF THE EIGHT COUNTERS IN THE INGRESS NBI. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET<br>- 3 BITS INDICATE WHICH NBI COUNTER GENERATED THE SEQUENCE NUMBER. |

PRECLASSIFICATION RESULTS

FIG. 3

| WIDTH | DESCRIPTION |
|---|---|
| 32-BITS | ADDRESS INFO INDICATING WHERE THE HEADER PORTION IS STORED. 6 BITS INDICATE THE ISLAND THAT CONTAINS THE CTM WHERE THE HEADER PORTION IS STORED. 4 BITS INDICATE THE CTM DATA MASTER ID. 9 BITS ARE A PPI NUMBER THAT THE PACKET ENGINE CAN USE TO IDENTIFY A BUFFER IN THE CTM. |
| 32-BITS | ADDRESS INFO INDICATING WHERE THE PAYLOAD PORTION IS STORED. SOME BITS INDICATE THE ISLAND WHERE THE BUFFER RESIDES, AND OTHER BITS ARE THE ADDRESS OF THE BUFFER. TYPICALLY THE INDICATED BUFFER ALSO STORES THE INITIAL PART OF THE HEADER AS WELL. |
| 16-BITS | PACKET LENGTH. |
| 32-BITS | SEQUENCE NUMBER IN A SET OF FLOWS. IN THE CASE OF THE INGRESS NBI BEING THE SOURCE ISLAND, THE LOWER ORDER 16 BITS OF THIS FIELD CONTAIN THE 16-BIT "INPUT SEQUENCE NUMBER" AS GENERATED BY ONE OF THE EIGHT COUNTERS IN THE INGRESS NBI. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

INGRESS PACKET DESCRIPTOR

FIG. 4

| INPUT | | OUTPUT |
|---|---|---|
| - COUNTER NUMBER (IF THE SOURCE IS AN NBI)<br>- RING NUMBER (IF THE SOURCE IS A PCIE)<br>- QUEUE NUMBER (IF THE SOURCE IS ILA)<br>(3 BITS) | SOURCE ISLAND<br><br>(6 BITS) | ORDERING CONTEXT NUMBER<br>(6 BITS) |
| 000 | 001000 (INGRESS-NBI(1)) | 000000 |
| 001 | 001000 (INGRESS-NBI(1)) | 000001 |
| 010 | 001000 (INGRESS-NBI(1)) | 000010 |
| 011 | 001000 (INGRESS-NBI(1)) | 000011 |
| • • • | • • • | • • • |

MAPPING TO DETERMINE THE ORDERING CONTEXT

FIG. 5

| WIDTH | DESCRIPTION |
|---|---|
| 32-BITS | ADDRESS INFO INDICATING WHERE THE HEADER PORTION IS STORED. 6 BITS INDICATE THE ISLAND OF THE CTM. 4 BITS INDICATE THE CTM DATA MASTER ID. 9 BITS ARE A PPI NUMBER. |
| 32-BITS | ADDRESS INFO INDICATING WHERE THE PAYLOAD PORTION IS STORED. SOME BITS INDICATE THE ISLAND WHERE THE BUFFER RESIDES, AND OTHER BITS ARE THE ADDRESS OF THE BUFFER. TYPICALLY THE INDICATED BUFFER ALSO STORES THE INITIAL PART OF THE HEADER AS WELL. |
| 16-BITS | PACKET LENGTH. |
| 32-BITS | SEQUENCE NUMBER OF THE PACKET (THE LOWER ORDER 12 BITS OF THE 32-BITS ARE A 12-BIT "TRANSMIT SEQUENCE NUMBER". THE EGRESS PACKET DESCRIPTOR DOES NOT CONTAIN THE "ORDERING SEQUENCE NUMBER" THAT WAS PRESENT IN THE INGRESS PACKET DESCRIPTOR. |
| 10-BITS | QUEUE NUMBER. THE LOWER 10 BITS INDICATE THE SCHEDULER QUEUE TO WHICH THE PACKET BELONGS. THIS CHOICE OF THIS "SCHEDULER QUEUE" DETERMINES QoS HANDLING. |
| 8-BITS | I/O DESTINATION TO WHICH THE PACKET IS TO BE SENT. |
| 5-BITS | PACKET SEQUENCER IDENTIFICATION. THIS NUMBER IDENTIFIES THE "REORDER QUEUE" IF THE DESTINATION IS AN EGRESS NBI. |

EGRESS PACKET DESCRIPTOR

FIG. 6

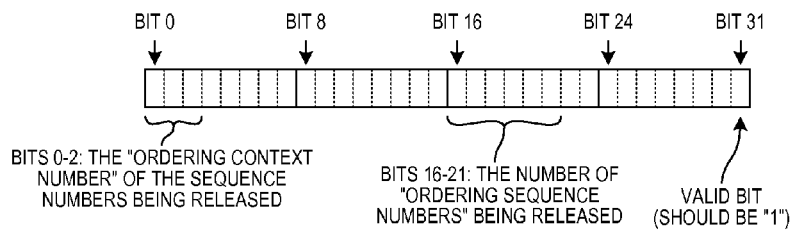

RELEASE FUNCTION CALL

FIG. 7

THE 32-BIT PAYLOAD OF THE RELEASE MESSAGE

FIG. 8

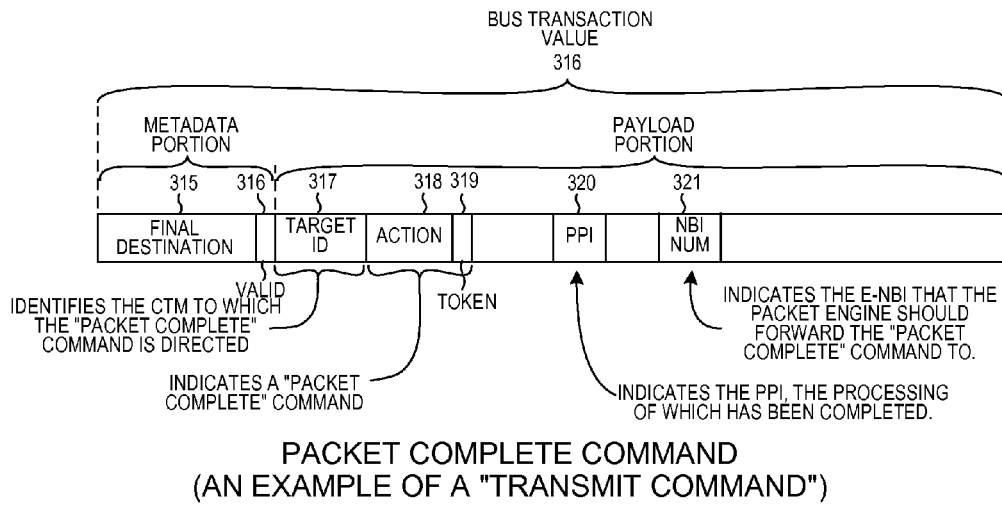

PACKET COMPLETE COMMAND
(AN EXAMPLE OF A "TRANSMIT COMMAND")

FIG. 9

| FIELD | WIDTH | DESCRIPTION |
|---|---|---|
| FINAL DESTINATION | 6 | DESTINATION ISLAND TO WHICH THE "PACKET COMPLETE" COMMAND IS GOING. |
| VALID | 1 | |
| TARGET | 4 | CTM TARGET ID (CTM TO WHICH THE "PPI DE-ALLOCATE" COMMAND IS GOING.) |
| ACTION | 5 | "10011" = PACKET COMPLETE COMMAND. |
| TOKEN | 2 | "XX" (DON'T CARE). |
| LENGTH | 5 | |
| BYTE MASK | 8 | [3;5] = DROP PRECEDENCE.<br>[5;0] = REORDER QUEUE NUMBER. |
| ADDRESS | 40 | [9;16] PPI OF THE PACKET PORTION THAT WAS COMPLETED. |
| DATA MASTER ISLAND | 6 | [2;4] = TOP TWO BITS OF PACKET START OFFSET.<br>[4;0] = SEQUENCE NUMBER [4;8]. |
| MASTER ID | 4 | [4;0] = SEQUENCE NUMBER [4;4]. |
| DATA REF | 14 | [2;12] = NBI NUMBER OF THE E-NBI THAT THE PACKET ENGINE SHOULD FORWARD THE "PACKET COMPLETE" COMMAND TO.<br>[1;11] = 0 = PM ENABLED, 1=PM DISABLED.<br>[1;10] = INDICATES A RETRY PACKET.<br>[10;0] = TX QUEUE NUMBER (SCHEDULER QUEUE NUMBER). |
| SIGNAL MASTER | 8 | [4;4] = DON'T CARE.<br>[4;0] = SEQUENCE NUMBER [4;0]. |
| SIGNAL REF | 7 | UNUSED. |

PACKET COMPLETE COMMAND
(AN EXAMPLE OF A "TRANSMIT COMMAND")

FIG. 10

```
unsigned int isl:6;       /* CTM island, zero for MU only pkts */
unsigned int down:1;      /* Queue down, must be zero */
unsigned int pktnum:9;    /* CTM packet number */
unsigned int bls:2;       /* NBI buffer list */
unsigned int sop:1;       /* Set for start of packet */
unsigned int eop:1;       /* Set for end of packet */
unsigned int offset:12;   /* Offset where data starts in NFP */ unsigned int split:2;     /* Split length allocated to the pkt */
unsigned int nbi:1;       /* NBI that received the pkt */
unsigned int mu_addr:29;  /* Pkt MU address */ unsigned int dd:1;        /* Descriptor done, must be set */
unsigned int offset:7;    /* Offset where packet starts */
unsigned int queue:8;     /* Queue, bitmask numbered */
unsigned int data_len:16; /* Length of frame + meta data */ unsigned int vlan:16;     /* VLAN if stripped */
unsigned int spare:12;
unsigned int flags:4;     /* RX flags */
```

NFD OUT SEND MESSAGE
(AN EXAMPLE OF A "TRANSMIT COMMAND")

FIG. 11

INGRESS MAC ISLAND

ONE SERDES CIRCUIT

INGRESS NBI ISLAND

ME ISLAND

CLUSTER TARGET MEMORY

MU ISLAND

EGRESS NBI ISLAND

EGRESS MAC ISLAND

PCIe ISLAND

PCIe BLOCK IN MORE DETAIL

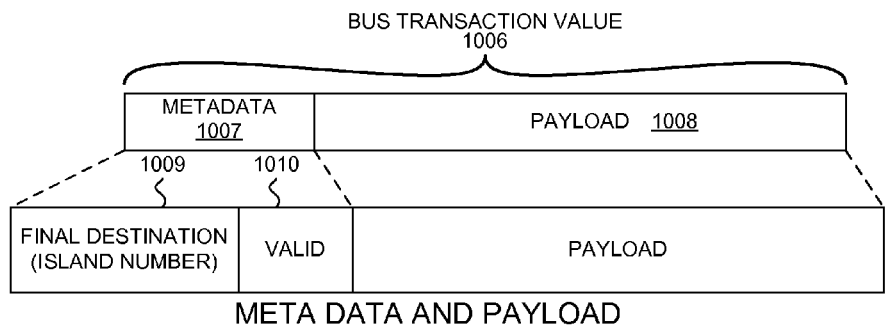

META DATA AND PAYLOAD

FIG. 24

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/ TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 25

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 26

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 27

| FIELD | WIDTH | DESCRIPTION |
| --- | --- | --- |
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 28

| FIELD | WIDTH | DESCRIPTION |
| --- | --- | --- |
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

DISTRIBUTED PACKET ORDERING SYSTEM HAVING SEPARATE WORKER AND OUTPUT PROCESSORS

TECHNICAL FIELD

The described embodiments relate generally to packet ordering systems that maintain the order of packets as packets are output from a multi-processor NFP (Network Flow Processor), and to atomic ticket release functions employed in such systems, and to related structures and methods.

BACKGROUND INFORMATION AND PRIOR ART

A type of integrated circuit referred to here as a "network flow processor" is a useful component in the design and manufacture of various types of networking equipment. For example, one particular prior art network flow processor integrated circuit has various processors and transactional memories, special processing circuitry and hardware engines, as well as ingress circuitry and egress circuitry. The transactional memories can perform several different atomic transactional memory operations, one of which is an atomic ticket release operation. To use the ticket release function of a transactional memory that has a ticket lock functionality, a processor passes the transactional memory a value in what is called an atomic "ticket release" command. This command is really a request to release. In response to receiving the ticket release command, the transactional memory compares the value carried by the command to a "next expected value" stored in a block of memory. If the value carried in the command is determined to match the next expected value stored in the block of memory, then the transactional memory outputs an indication of this. The value is said to have been "released". In addition, the transactional memory also indicates how many, if any, subsequent consecutive values were previously flagged by the transactional memory as having been previously received in other ticket release commands where the previously received values were not "released". The transactional memory outputs an indication that all such consecutive values should also be released. After outputting this information, the transactional memory updates the "next expected value" stored so that it points to the first value in the sequence of values that is not flagged. If, on the other hand, the value carried in the ticket release command is determined not to match the "next expected value" stored in the block of memory, then a bit in a bitmap maintained by the transactional memory is set to flag the fact that the out-of-sequence value was received, but that it was not released. The transactional memory is then available to process another atomic ticket release command. When the transactional memory outputs an indication of one or more consecutive values in response to a ticket release command, these values are said to have been "released". This ticket release mechanism is a general purpose mechanism provided by transactional memories on one type of prior art network flow processor. The transactional memories also provide other general purpose mechanisms. In the prior art network flow processor, packets are received onto the integrated circuit, and pass through the ingress circuitry, and are classified as belonging to one of a plurality of groups of flows. In one example, packets of each such group of flows are processed by a separate software pipeline. Packets are put into the software pipeline for processing the proper order, so the packets are then output from the software pipeline in the proper order, or in roughly the proper order. The packets of such a group of flows then pass through the egress circuitry, including the reordering hardware circuitry of the egress circuitry, and pass out of the network flow processor. For additional information on this prior art network flow processor, as well as for additional information on transactional memories in prior art network flow processors in general, see: 1) U.S. Pat. No. 8,775,686, entitled "Transactional Memory That Performs An Atomic Metering Command", by Gavin J. Stark, filed Aug. 29, 2012; 2) U.S. Patent Publication Number 20140075147, having U.S. patent application Ser. No. 13/609,039, entitled "Transactional Memory That Performs An Atomic Look-Up, Add and Lock Operation", by Gavin J. Stark et al., filed Sep. 10, 2012; and 3) U.S. patent application Ser. No. 14/172,844, entitled "Network Interface Device That Maps Host Bus Writes Of Configuration Information For Virtual NIDs Into A Small Transactional Memory", filed Feb. 4, 2014, by Gavin J. Stark et al. (the entire subject matter of these three patent documents is incorporated by reference herein).

SUMMARY

An Island-Based Network Flow Processor (IB-NFP) integrated circuit receives packets of many flows, and classifies each of these incoming packets as belonging to one of a number of ordering contexts. As packets of this ordering context flow through the IB-NFP they are distributed to a set of Worker Processors (WPs), so that each packet is processed by one and only one WP, but multiple WPs are typically operating on packets of the ordering context at the same time.

In a first novel aspect, a distributed packet ordering system includes this first set of WPs, and also includes a second set of Output Processors (OPs). In one example of the ordering system there are more than one hundred WPs and less than twenty-five OPs. The ordering system handles releasing packets from the first set of WPs to the second set of OPs in the correct order, even though the WPs may complete their application layer processing of individual packets in an out-of-order fashion. Packets are released to the OPs, and are processed through the OPs, and are passed to egress circuitry, in the proper sequential order in accordance with "ordering sequence numbers" for the ordering context. There is one and only one OP that is responsible for generating "transmit commands" for packets of each ordering context, and there are multiple such OPs to support the generation of transmit commands for many different ordering contexts. For a given packet, the OP for an ordering context generates a transmit command in the correct format as required by the particular egress circuit destination through which the packet will exit the IB-NFP. For example, the OP can generate a transmit command to be of a first format if the destination of a packet is a first egress circuit, and the OP can generate the transmit command to be of a second format if the destination of the packet is a second egress circuit, where the first and second formats are different. The ordering system code executing on the WPs does not include code for generating these transmit commands, and the ordering system code executing on the OPs does not include application layer code nor does it include code for handling the reording of packets and the generation release messages to OPs. This novel distributed and segmented architecture of having a first set of WPs and a second set of OPs serves to simplify software operation, to reduce the amount of memory required to store the program code of the ordering system, and facilitates good usage of IB-NFP processing resources. The system is flexible and scalable to instances involving thousands of WPs.

In a second novel aspect, an Island-Based Network Flow Processor (IB-NFP) receives packets of many flows, and classifies each of these packets as belonging to one of a plurality of ordering contexts. The packets of an ordering context are distributed to a set of Worker Processors (WPs), so that each packet of the ordering context is processed by one and only one WP, but multiple WPs are typically operating on packets of the ordering context at a given same time. In this novel aspect, the WPs use a special atomic ticket release functionality of a special transactional memory to assist in determining when to indicate to another set of Output Processors (OP) that a packet of the ordering context should be released. The transactional memory maintains a ticket release bitmap for the ordering context. In this way, packets of the ordering context are indicated to the set of OPs as being to be released in the correct order (in accordance with their "ordering sequence numbers"), even though the WPs may complete their application layer processing of the packets in an out-of-order fashion. For a packet that is indicated as to be released, an OP generates a "transmit command" to the proper destination egress circuit such that an egress packet descriptor for the packet is then put into a properly ordered stream of packet egress packet descriptors, so that the corresponding packet will then be output from the IB-NFP. The packets that correspond to the egress packet descriptors in the stream are in order in accordance with their "ordering sequence numbers". For a given packet, the OP generates a transmit command in the correct format as required by the particular egress destination circuit through which the packet will exit the IB-NFP. In one example, a first packet of an ordering context is to exit from the IB-NFP through a first egress destination circuit. The OP therefore generates the transmit command for this first packet so that the transmit command has a first format. A second packet of the same ordering context is, however, to exit from the IB-NFP through a second egress destination circuit. The OP therefore generates the transmit command for this second packet so that the transmit command has a second format.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a flowchart of a method in accordance with one novel aspect.

FIG. 3 is a diagram that illustrates various parts of a "preclassification results" value that is generated by a pico-engine pool.

FIG. 4 is a diagram that illustrates various parts of an ingress packet descriptor.

FIG. 5 is a diagram of mapping table used in the distributed packet ordering system.

FIG. 6 is a diagram that illustrates various parts of an egress packet descriptor.

FIG. 7 is a diagram of an example of a release request.

FIG. 8 is a diagram of an example of a release message.

FIG. 9 is a diagram that shows a first example of a "transmit command", which in this case is a "packet complete command".

FIG. 10 is a table that various parts of the packet complete command of FIG. 9.

FIG. 11 is a diagram that shows a second example of a "transmit command", which in this case is an "NFD Out Send Message".

FIG. 24 is a diagram of a CPP bus transaction value.

FIG. 25 is a table that sets forth the various fields in a command payload of a CPP bus command.

FIG. 26 is a table that sets forth the various fields in a pull-id payload of a CPP bus transaction.

FIG. 27 is a table that sets forth the various fields in a data payload of a CPP bus transaction.

FIG. 28 is a table that sets forth the various fields of a CPP data payload in the case of a pull.

FIG. 29 is a table that sets forth the various fields of a CPP data payload in the case of a push.

DETAILED DESCRIPTION

Figure 1:
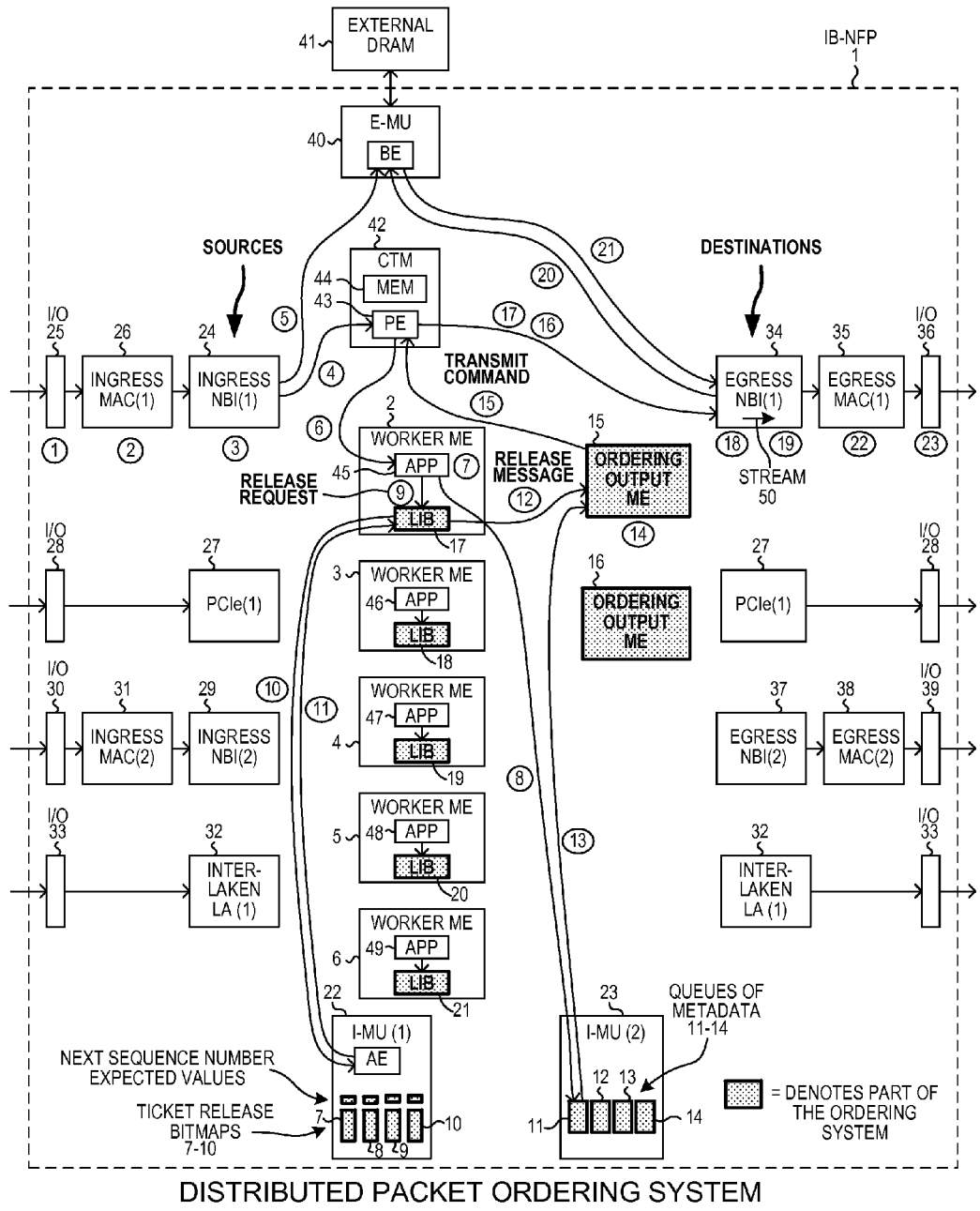
FIG. 1 is a diagram of a distributed packet ordering system in accordance with one novel aspect.

Reference will now be made in detail to background examples and some embodiments of the invention, examples of which are illustrated in the accompanying drawings. FIG. 1 is a diagram of a distributed packet ordering system that is embodied in an Island-Based Network Flow Processor (IB-NFP) integrated circuit 1. The distributed packet ordering system includes an amount of library code (denoted "LIB" in the diagram) executing in each of a plurality of Worker Processors (WPs) 2-6, a plurality of ticket release bitmaps 7-10, a plurality of queues 11-14 of metadata, and a plurality of ordering Output Processors (OP) 15-16. The amount of library code executing in a WP is identical to the library code executing in each other of the WPs. In the diagram, amount of library code 17 is executing on WP 2, amount of library code 18 is executing on WP 3, amount of library code 19 is executing on WP 4, and amount of library code 20 is executing on WP 5, and an amount of library code 21 is executing on WP 6. The term "code" here means processor-executable instructions that are stored in a processor-readable medium (for example, a memory). A processor fetches such instructions from the memory, and executes them. A transactional memory 22 maintains the plurality of ticket release bitmaps 7-10. There is one ticket release bitmap for each one of a corresponding plurality of "ordering contexts". The ticket release bitmap for an ordering context maintains or tracks the release state of each packet belonging to the ordering context. The ticket release bitmap tracks a packet by tracking its associated "ordering sequence number". For each "ordering context", there is also a queue of metadata. These queues 11-14 of metadata are stored in a second memory 23. The distributed packet ordering system also includes an amount of output processing code executing on OP 15, and another amount of output processing code executing on OP 16. In the diagram, the blocks representing the various parts of the distributed ordering system are darkened and denoted by stippling.

In addition to the parts outlined above, the IB-NFP 1 includes four "sources" of packets for the distributed ordering system. A first source is ingress NBI(1) circuit 24. Packets can pass into the IB-NFP via input/output circuitry 25, and via an ingress MAC(1) circuit 26, and then through the ingress NBI(1) circuit 24 and on to the distributed packet ordering system. In this sense, the ingress NBI(1) circuit is a first source. A second source is PCIe(1) circuit 27. Packets can pass into the IB-NFP via input/output circuitry 28 and then through the PCIe(1) circuit 27 and on to the distributed packet ordering system. In this sense, the PCIe(1) circuit 27 is a second source. A third source is ingress NBI(2) circuit 29. This circuit is substantially identical to the ingress NBI(1) circuit. Each of the two circuits 24 and 29 assigns packet sequence numbers to packets without reference to, or knowledge of, how the other circuit is assigning its packet sequence numbers. Packets can pass into the IB-NFP via input/output circuitry 30, and pass through an ingress MAC (2) circuit 31, and then through the ingress NBI(2) circuit 29, and on to the distributed packet ordering system. In this sense, the ingress NBI(2) circuit 29 is a third source. A fourth source is an Interlaken LA(1) circuit 32. Packets can pass into the IB-NFP via input/output circuitry 33 and then through the Interlaken LA(1) circuit 32 and on to the distributed packet ordering system. In this sense, the Interlaken LA(1) circuit 32 is a fourth source. The input/output circuits 25, 28, 30, 33, 36 and 39 depicted in FIG. 1 include integrated circuit terminals and SerDes circuitry as necessary to interface to circuitry outside the IB-NFP.

The IB-NFP 1 also includes four "destinations" for packets. A first destination is egress NBI(1) circuit 34. Packets can pass out of the IB-NFP via egress NBI(1) circuit 34, and then through an egress MAC(1) circuit 35, and then through input/output circuitry 36, and out of the IB-NFP. In this sense, the egress NBI(1) circuit 34 is a first destination for packets. Packets can also pass out of the IB-NFP via PCIe(1) circuit 27, and then through input/output circuitry 28. Although the destination circuit is shown again as another block in the illustration, the PCIe(1) circuit has both ingress and egress circuitry, so the same block 27 is shown as being a source and a destination. Packets can also pass out of the IB-NFP via egress NBI(2) circuit 37, and then through an egress MAC(2) circuit 38, and then through input/output circuitry 39. In this sense, the egress NBI(2) circuit 37 is a third destination for packets. Packets can also pass out of the IB-NFP via Interlaken LA(1) circuit 32, and then through input/output circuitry 33. Although the destination circuit is shown again as another block in the illustration, the Interlaken LA(1) circuit has both ingress and egress circuitry, so the same block 32 is shown as being a source and a destination.

In one particular example, the PCIe(1) circuit 27 is used to communicate packets and other information back and forth between the IB-NFP 1 and a host computer. The Interlaken LA(1) circuit 32 is used to communicate packets and other information back and forth between the IB-NFP integrated circuit and another identical IB-NFP integrated circuit. The two IB-NFP integrated circuits may, for example, be disposed on an expansion card (a printed circuit board) that is coupled to, and works with, the host computer. The host computer and the expansion card together are a physical network device (such as a server). In one example, the physical network device is a physical server machine that implements multiple virtual web servers as set forth in: U.S. patent application Ser. No. 14/172,844, entitled "Network Interface Device That Maps Host Bus Writes Of Configurable Information For Virtual NIDs Into A Small Transactional Memory", filed Feb. 4, 2014, by Gavin J. Stark et al. (the entire subject matter of this patent application is incorporated by reference herein).

In addition, IB-NFP 1 of FIG. 1 includes an external memory unit (E-MU) interface circuit 40. This E-MU interface circuit 40 allows circuitry on the IB-NFP to access an amount of external DRAM 41 via the E-MU interface circuit 40. Processors and other circuits on the IB-NFP can interact with the E-MU using a Command/Push/Pull (CPP) bus as described in further detail below. In addition, the IB-NFP 1 includes a number of transactional memories referred to here as Cluster Target Memories (CTMs). Although only one CTM 42 is shown in the diagram of FIG. 1 due to space limitations in the diagram, the IB-NFP 1 actually has multiple such CTMs. As explained in further detail below, there is one such CTM in each ME island of the IB-NFP. Each CTM has a Packet Engine (PE) and an amount of memory. For CTM 42, the packet engine is identified by reference numeral 43 and the memory is identified by reference numeral 44.

In a high-level description of an operation of the distributed packet ordering system, packets of many different flows of are received onto the IB-NFP via various different sources. These flows are grouped into subsets of flows. A packet of such a subset is referred to as belonging to an "ordering context". Packets belonging to many different ordering contexts are typically passing into the IB-NFP, are being processed by processors inside the IB-NFP, and are being output from the IB-NFP, at a given time. Each packet of an ordering context is assigned an "ordering sequence number" by the source that receives the packet, where the sequence numbers ("ordering sequence numbers") of the packets of an ordering context indicate the order in which the packets were received onto the IB-NFP. In one example, an "ordering sequence number" is a 16-bit value, the lower eight bits of which are significant. Accordingly, assignment of the ordering sequence numbers for the associated "ordering context" start at "0000 0000 0000 0000", and increment up to "0000 0000 1111 1111", and then roll over and start again at "0000 0000 0000 0000". Each packet of the ordering context is stamped with one of these "ordering sequence numbers" such that successive packets that are received onto the IB-NFP are assigned consecutive "ordering sequence numbers".

After being stamped with the "ordering sequence numbers", the packets of an "ordering context" are then spread out, or are distributed to, a set of Worker Processors (WP) that then perform application layer processing on the packets. Rather than having one WP perform this application layer processing on each packet, one by one, in a purely serial fashion, the processing load of performing this application layer processing is spread out among the many WPs of the set. Each packet is typically processed by one and only one such WP, and many such WPs are typically performing application layer processing on different packets of a particular "ordering context" at a given time. One of these WPs may carry out its processing more slowly than another, or for some other reason, the completion of the application layer processing by the WPs does not occur in the same order in which the packets were initially supplied to the WPs for processing. The distributed packet ordering system therefore effectively holds up the forwarding of selected packets as output by WPs as necessary so that when "egress packet descriptors" of the packets of the ordering context are supplied in a stream to an output scheduler in a destination circuit, the packets (to which these "egress packet descriptors" refer) as supplied to this scheduler (or traffic manager) are in the same order (with respect to one another) in which the packets were when the packets were received onto the IB-NFP. The packets may not be actually output from the IB-NFP in the received order, but their descriptors are present in the stream (as the stream is supplied to the scheduler or to the traffic manager) in the proper order.

Figure 2A:
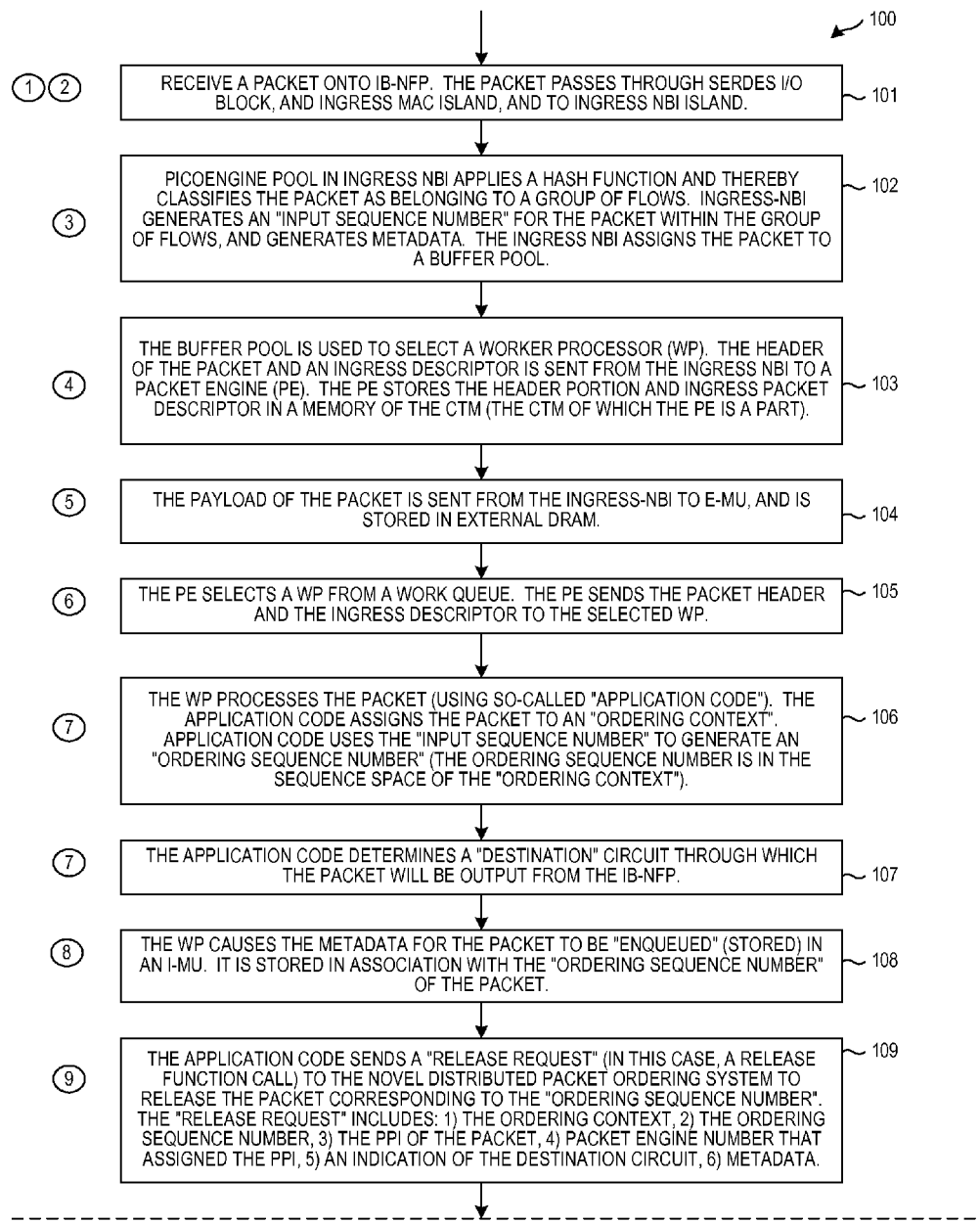
FIG. 2A is a part of a larger FIG. 2, where
Figure 2B:
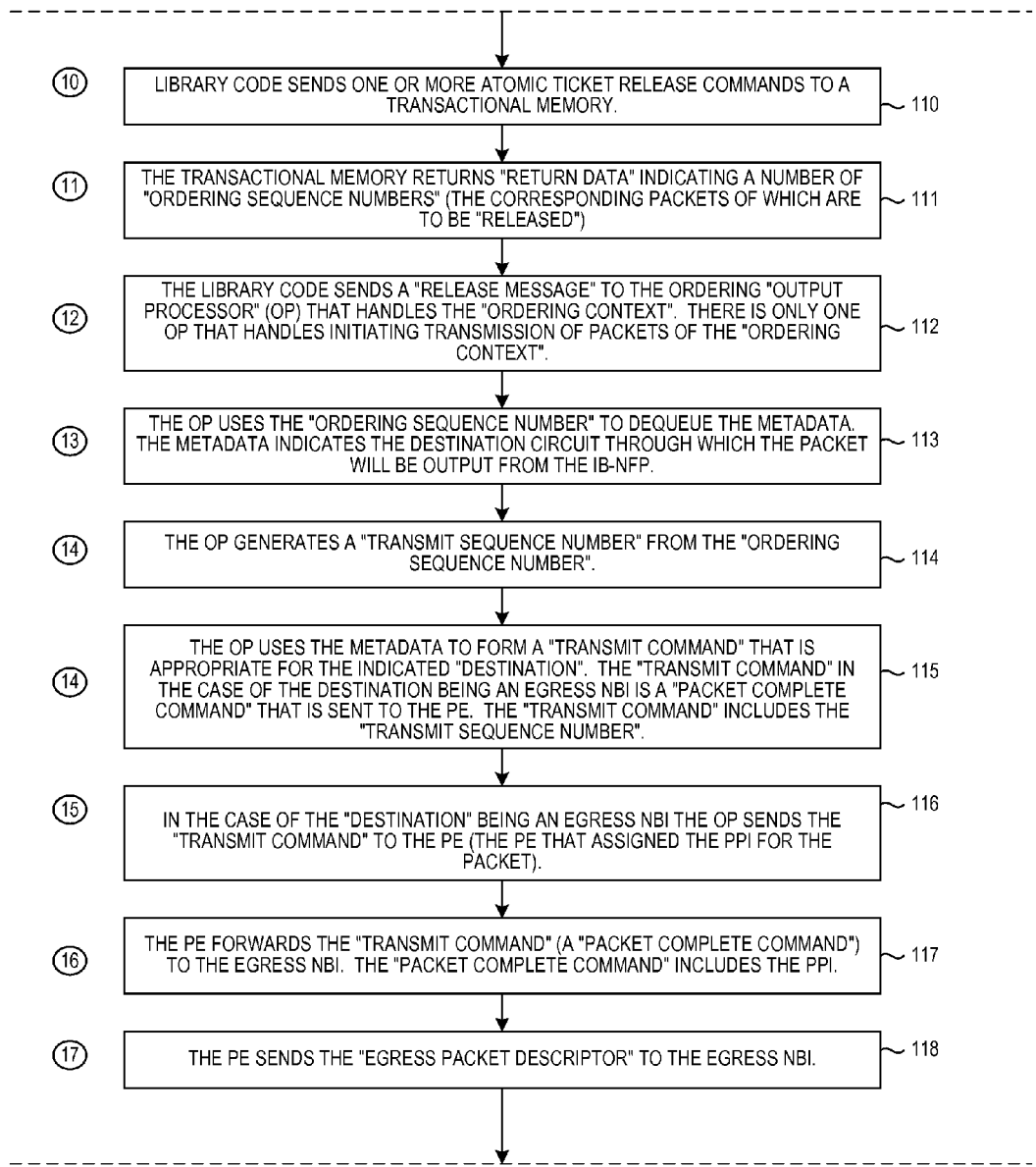
FIG. 2B is a part of the larger FIG. 2.
Figure 2C:
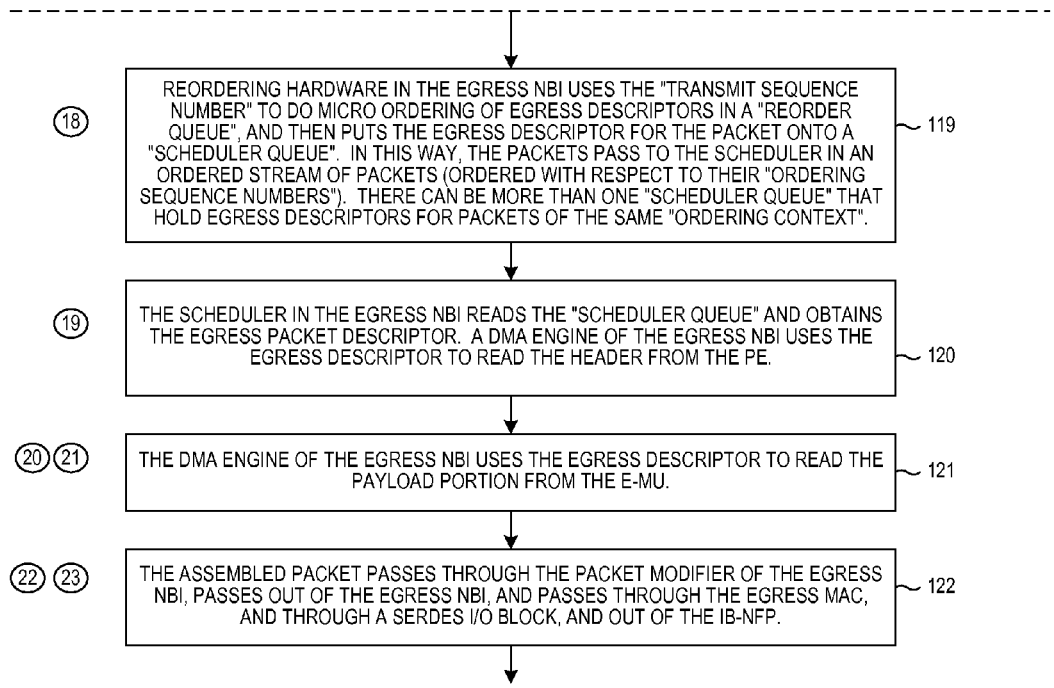
FIG. 2C is a part of the larger FIG. 2.

FIG. 2 is a simplified flowchart that illustrates a method of operation of the distributed packet ordering system. A circled reference numeral appearing in the diagram of FIG. 1 corresponds to the method step in the flowchart of FIG. 2 that is labeled with the same circled reference numeral. A packet is received (step 101) onto the IB-NFP, and passes through the SerDes input/output circuitry 25, and through the ingress MAC(1) circuit 26, and to the ingress NBI(1) circuit 24. There is a group of small processors called the "picoengine pool" in the ingress NBI(1) circuit 24. A picoengine processor in this picoengine pool performs a hash function (step 102) on various fields in the header of the packet and thereby classifies the packet as belonging to a set or group of flows. In one example, the IP source address, IP destination address, TCP source port, and TCP destination port and the application layer protocol type (the so-called 5-tuple) are supplied as inputs to the hashing function, and the hashing function outputs a hash value. The hashing function employed determines which particular flows will be hashed to the same hash value. The picoengine pool includes an output data reader block. The output data reader block of the picoengine pool includes eight different digital counters. Each of these eight digital counters generates or outputs a corresponding sequence of "input sequence numbers". These input sequence numbers are thirty-two bits long, but only the lower order sixteen bits are significant. When a packet is received that hashes to a given hash value, the picoengine uses the hash value to classify the packet into one of eight classes, and then includes a 3-bit value in its output data that indicates one of the eight classes. As the output data passes out of the picoengine pool, the output data passes through the output data reader block and the one of the digital counters identified by the 3-bit value inserts into the output data its counter output value (also referred to here as the "input sequence number"). After the input sequence number is inserted, the counter increments for the next occurrence. The resulting "preclassification results" for the packet therefore includes, among many other things, the following: 1) a 6-bit value (indicating one of a plurality of "buffer pools"), 2) a 32-bit "input sequence number" (only sixteen bits of which are significant), and 3) about 100 bits of metadata. A 2-bit value of the metadata indicates the particular island that is the source of the packet. A 3-bit value of the metadata indicates which NBI counter generated the "input sequence number". In the present example, the source of the packet is the ingress NBI(1) island. For each packet analyzed by the picoengine pool, the picoengine pool outputs one such "preclassification results" value.

FIG. 3 is a diagram that illustrates the "preclassification results" for a packet.

The ingress-NBI(1) circuit 24 also maintains a list of values. Each such list is called a "buffer pool". The criteria that the picoengine uses to determine which particular buffer pool to use for a given packet is different from the criteria used to select the NBI counter that generates the "input sequence number". Each value in a buffer pool identifies a target in an ME island where a header portion of a packet can be stored. In the example of FIG. 2, a buffer pool entry identifies a packet engine (PE) in one of the ME islands. The DMA engine in the ingress NBI island that receives the preclassification results uses the buffer pool number (the first field of the "preclassification results") to pull an entry value off the proper "buffer pool". It then uses this entry value to identify a PE in a particular Cluster Target Memory (CTM) in a particular ME island (step 103).

In addition to containing a list of buffer pool entries, a buffer pool also has associated attributes. These attributes include: 1) an indication of a maximum CTM buffer size to use to store header portions in the CTM (the remaining packet data goes into an MU buffer); 2) a primary list of MU buffers to use to store the remaining packet data; 3) a backup list of MU buffers to use to store the packet data (when the first list is exhausted); 4) an offset to the start of the packet data where the packet data is stored in the CTM buffer; 5) a list of buffer pool entries, each of which identifies an ME island and packet engine to receive the packet. Multiple buffer pools can be used to send packet data to the same island.

In the example of the flowchart of FIG. 2, the DMA engine in the ingress-NBI(1) circuit 24 communicates with the identified packet engine (PE) across the CPP data bus of the IB-NFP integrated circuit and receives back from the PE a PPI (Packet Portion Identifier). The DMA engine then sends an "ingress packet descriptor" (that includes the picoengine preclassification results and metadata) and the initial portion of the packet (including initial headers) to the PE along with the PPI.

FIG. 4 is a diagram that illustrates the various fields of an "ingress packet descriptor" as the ingress packet descriptor is output by the DMA engine of the ingress NBI island. The PE handles storing this ingress packet descriptor and the header portion in the memory of the CTM (the particular CTM that contains the PE identified by the buffer pool entry value). In the example of FIG. 2, the ingress packet descriptor and header portion is stored in memory 44.

The ingress packet descriptor of FIG. 4 includes a 32-bit field that indicates where the header portion of the packet is stored in the CTM. In this example, because the ingress packet descriptor is stored in the CTM at a location immediately before the location that stores the corresponding header portion. Accordingly, the 32-bit field also indicates where the ingress packet descriptor is stored. The information in this 32-bit field includes: 1) information that identifies the packet engine PE that is responsible for storing the ingress packet descriptor, 2) information that identifies the island where the PE is located, and 3) the 9-bit PPI number associated with the packet header.

The ingress NBI(1) circuit 24 also maintains a "buffer list". The buffer list is a list of addresses of buffers (starting addresses of buffers) where packet payloads can be stored. The DMA engine in the ingress NBI block pops the buffer list, and then sends (step 104) the remainder of the packet (typically this includes the payload) that exceeds the size of the CTM buffer to the buffer identified by the popped address. In this case, the address where the remainder of the packet (the payload) is stored indicates a buffer accessed by E-MU 40, such that the payload is actually stored in a buffer in the external DRAM 41. Note that the ingress packet descriptor of FIG. 4 also includes a 32-bit field that refers to this secondary buffer (where the payload of the packet is stored in external DRAM in this example).

At this point in the example of FIG. 2, the ingress packet descriptor and a portion of the header are stored in the memory 44 of the CTM 42. These values are stored in association with the PPI of the packet, so the PE can later use the PPI to retrieve these values. The payload of the packet, on the other hand, is stored in the external DRAM 41. The location where the payload is stored is a part of the ingress packet descriptor.

The PE 43 maintains a "work queue" of entries. Each entry value on this work queue identifies a WP that is available to process a packet. A microengine thread can put itself on a work queue of the PE in any island (including those islands outside of the island that contains the microengine). The PE pops the work queue, and thereby obtains an entry value that identifies which WP will process the packet. In this way, the PE selects (step 105) which WP will process the packet. Generally, any WPs in an island that works on packets can work on a packet regardless of which ordering context it belongs to. Due to this capability, scalability of the ordering system is enhanced because the full set of WPs can be used at all times, even when there is an imbalance in how packets are assigned to ordering contexts. Because there are multiple WPs having entries in the work queue, packet headers (of packets belonging to the ordering context) to be operated on are distributed out to these WPs.

In the example of FIG. 2, the ingress packet descriptor and header portion is forwarded by the PE 43 to the WP 2. WP 2 performs application layer processing on the packet. This processing is performed (step 106) by identical application layer code 45 that executes on WP 2. Each WP that processes packets has a copy of this code. In FIG. 1, these amounts of application layer code are identified by reference numerals 45-49. In the example of FIG. 2, WP 2 as selected by the PE from the "work queue", so application layer code 45 performs application layer processing on the packet.

Upon receiving the ingress packet descriptor and header portion, the WP 2 performs an initial mapping operation to assign the packet to one of the plurality of "ordering contexts". There is a one-to-one relationship between each counter (the counters in the ingress devices that generate the "input sequence numbers") and a corresponding one of the "ordering contexts". For each of these counters, there is one and only one ordering context.

FIG. 5 is a diagram of a mapping table used by the WP to perform this mapping function. There are eight counters in each ingress NBI island, and each is designated by a 3-bit number. The ingress NBI(1) island, the ingress NBI(2) island, the PCIe(1) island, and the Interlaken LA (1) island are designated in this example by numbers "001000", "000100", "000010" and "000001", respectively. From the 3-bit counter number (the counter number within the source island where the counter is found) and the 6-bit source island number, a 6-bit number indicating the "ordering context" is determined using the mapping table. In the event the source island is a PCIe island, then the 3-bit field indicates the ring number and the source field identifies which PCIe island it was that is the source island where the ring is located. In the event the source island is an Interlaken LA island, then the 3-bit field indicates a queue and the 6-bit source field identifies which Interlaken LA island it was where the queue is located. The source field value is a 6-bit value because there are up to sixty-three islands. The same identical mapping table can be hardcoded into each of the WPs, or alternatively a single version of the mapping table can be provided as a central resource for all the WPs to use. The single mapping table may, for example, be stored in SRAM memory that is accessible to the WPs via the CPP bus through the I-MU island 205.

In addition to determining the 6-bit "ordering context number", the WP also determines an "ordering sequence number". In the present example, the "ordering sequence number" (as used by the global distributed packet ordering system) is simply the "input sequence number" (in the present example, as generated by one of the counters in the ingress-NBI. The "ordering sequence number" is a 16-bit value, however the application may choose to disregard some of the upper bits in this sequence number on a ordering-context-by-ordering-context basis. In the present example of FIG. 2, only the lower eight bits of the 16-bit ordering sequence number are significant. There is one such set of ordering sequence numbers for each "ordering context".

In addition to determining the "ordering context" and in addition to assigning the packet an "ordering sequence number", the application layer code executing on the WP also determines a "destination" for the packet (step 107). In the example of FIG. 1, the destination is one of the four egress circuits: the egress NBI(1) circuit 34, the PCIe circuit 27, the egress NBI circuit 37, and the Interlaken LA(1) circuit 32. Prior to this stage of processing of the packet, the destination of the packet is not known.

In one example, WP 2 uses information obtained by the application layer processing of the packet to modify the "ingress packet descriptor" to be an "egress packet descriptor", and then causes the egress packet descriptor to be restored in the CTM in association with the PPI. The worker ME does this by reading the "ingress packet descriptor" out of the CTM using the PPI, by modifying the ingress packet descriptor into an egress packet descriptor, and by then causing the "egress packet descriptor" to be written back into the CTM. The ingress and egress packet descriptors are stored in the CTM (as controlled by the PE) at the same location, as determined by the PPI that has been allocated to the packet by the PE.

In another example, rather than the worker ME causing the egress packet descriptor to be stored back in the CTM, the application layer functionality in the WP generates the egress packet descriptor from information in the ingress packet descriptor as described above but most of that is forwarded directly from an OP processor to the destination. Operation of the OP processor is described below. Either way of storing and forwarding the egress packet descriptor can be used.

FIG. 6 is a diagram that shows the various fields of an "egress packet descriptor". In addition to determining the destination, and in addition to generating the egress packet descriptor, the WP 2 causes the metadata to be stored (enqueued) in a queue for the "ordering context" (step 108). In the I-MU 23 memory, there is one queue for each ordering context, and the metadata is stored in the queue for the ordering context of the packet. This stored metadata includes: 1) an indication of the destination, and 2) information about how to format a "transmit command" for the packet. This metadata is stored in the queue in memory 23 in association with the "ordering sequence number" of the packet. In one advantageous aspect, the memory 23 that stores the queues 11-14 is a different memory from the memory 22 that stores the ticket release bitmaps 7-10.

In the example of FIG. 2, when WP 2 has completed its application layer processing of the packet, the WP 2 sends a "release request" (step 109) to the distributed packet ordering system. This "release request" is a request to release the packet having a particular "ordering sequence number" indicated in the release request. The term "release" here means to forward the packet to the egress circuitry of the IB-NFP so that the packet will then be output from the IB-NFP. This forwarding may involving forwarding the actual packet, or may involve forwarding a descriptor or other information about the packet. As mentioned above, in the example of FIG. 2, each WP has an amount of library code. The "release request" sent by application code 45 of WP 2 is a function call referred to as the "release function call". This function call is a call to the library code 17 executing on the WP 2.

FIG. 7 is a diagram that depicts the "release function call". The release function call includes: 1) a parameter that identifies the 6-bit "ordering context number" of the packet, 2) a parameter that identifies the "ordering sequence number" of the packet, 3) a parameter that identifies the metadata. The identified metadata in turn identifies: 4) the PPI that the packet engine assigned to the packet, 5) the particular packet engine (PE) that assigned the PPI, and 6) the destination to which the packet will be sent. In the specific example of FIG. 7, the PPI, the identifier of the PE, and the destination of the packet information are indicated by the "release function call" by identifying a write transfer register that in turn contains this information.

The distributed packet ordering system maintains one ticket release bitmap for each ordering context. In the example of FIG. 1, these ticket release bitmaps 7-10 are maintained in the transactional memory 22, and each ticket release bitmap includes enough flag bits to track the release state for all the possible sequence numbers of the ordering context. In addition, a "next expected sequence number" value (or "next sequence number expected" value) is maintained for each ticket release bitmap. In the illustration of FIG. 1, the "AE" stands for "atomic engine".

In the example of FIG. 2, the library code 17 uses the ticket release bitmap 7 to request release of the packet, such that the packet is only indicated as being "to be released" if the packet is the next packet in the ordering sequence (for that "ordering context") to be released. If a release request has not yet been received by the ticket release bitmap functionality for another packet having a lower "ordering sequence number", then the receipt of the "release request" will be flagged in the bitmap by setting a flag bit for the "ordering sequence number" set forth in the release request. In such a case, no packet will be indicated (by the ticket release function) as "to be released" in response to the release request. If, however, the release request is a request to release the packet whose ordering sequence number is the next sequence number expected as maintained by the transactional memory, then the release request will result in the release of the packet indicated by the release request. In addition, any subsequent packet or packets whose flag bits were set in the bitmap will also be indicated as "to be released" provided that there are no unflagged sequence numbers with "ordering sequence numbers" smaller than the packet being released. The terms "release" and "to be released" are used interchangeably here, and mean that an indication of a packet to be sent out of the IB-NFP is supplied to the egress circuitry of the chip, so that the packet will then be output from the IB-NFP. There is a stream 50 (of packets, or egress packet descriptors) present in the egress circuitry, where the packets or egress packets descriptors are present there in the stream 50 in the same order as the corresponding packets were received onto the IB-NFP.

In the example of FIG. 2, library code 17 sends an atomic ticket release command (step 110) to the Atomic Engine (AE) of the transactional memory 22. An atomic ticket release command in this example is a command/push/pull (CPP) bus command that: 1) identifies the "ordering sequence number" of a packet whose release is being requested, and 2) identifies the bitmap for the appropriate ordering context. The CPP command identifies the bitmap because it includes the starting address in the transactional memory where the bitmap is found. The transactional memory 22 responds to the atomic ticket release command by accessing the indicated ticket release bitmap, performing its atomic ticket release function, and then returning an amount of "return data" (step 111). The "return data" is returned as part of the overall CPP bus transaction of the atomic ticket release command. The return data includes a number, where this number is a number of consecutive "ordering sequence numbers" the corresponding packets of which are to be released. If any such packets are indicated by the return data as to be released, then the transactional memory 22 automatically updates the "next sequence number expected" value it stores so that the stored "next sequence number expected" value as stored in the transactional memory now points to the next ordering sequence number for which a release request has not been received. The operation of the transactional memory 22 is "atomic" in that once a first WP has initiated an atomic ticket release operation, no other ticket release operation from another WP can be initiated or can interfere with the bitmap or "next sequence number expected" value until the atomic ticket release operation of the first WP has been completed and the return data for that operation has been sent to the first WP.

In one novel aspect, there is one and only one Output Processor (OP) that handles generating "transmit commands" for an ordering context. In the present example, OP 15 is the OP that handles generating transmit commands for the "ordering context" of the packet that was just processed by WP 2. Accordingly, library code 17 responds to the "return data" that it receives back from the transactional memory 22 by sending a "release message" to OP 15 (step 112).

FIG. 8 is a diagram that sets forth the format of the 32-bit payload of the release message. The release message is a CPP bus transaction whose payload communicates the single 32-bit value. Bits 0-2 of this 32-bit value indicate the ordering context, for which a release is being done. Bits 3-15 of this 32-bit value are unused. Bits 16-21 of this 32-bit value are a number, where the number is the number of next "ordering sequence numbers" that are to be released. The number can be one, or a larger number. Bits 22-30 of this 32-bit value are unused. Bit 31 of this 32-bit value is a valid bit that is set to "1".

The OP that receives the "release message" keeps track of the last "ordering sequence number" that it released for the indicated "ordering context", so when the OP receives indication that the next certain number of ordering sequence numbers are to be released in a release message, the OP can determine what the corresponding "ordering sequence numbers" are. The release message therefor need not contain the actual ordering sequence numbers of the packets to be released, but rather the release message only needs to contain a number of sequence numbers. In the example of FIG. 2, OP 15 handles generating "transmit commands" for the ordering context of the packet, so the release message is sent to OP 15.

In response to receiving a release message, the OP uses the "ordering sequence number" of any packet that is indicated to be released to retrieve (step 113) the associated metadata from the memory 23. This is referred to as "dequeueing" the metadata. As mentioned above, the metadata was originally stored (enqueued) in memory 23 such that it was indexed by the ordering sequence number of the packet. Accordingly, the ordering sequence number of the packet to be released can later be used to identify the particular metadata for the desired packet and to read (dequeue) that metadata out of memory 23. The metadata as dequeued in this way from memory 23 indicates the destination through which the packet will be output when it is output from the IB-NFP.

Each different type of destination to which a packet may be sent may require a "transmit command" that has a different form. For example, a transmit command to cause a packet to be sent out through the egress NBI(1) circuit 34 has a first format, and a transmit command to cause a packet to be sent out through the PCIe(1) circuit 27 has a second format, where the first and second formats are different. OP 15 has specialized code for generating "transmit commands" of the various different formats, as required by the different possible destinations to which a packet can be sent. The OP uses the destination information (as obtained from the dequeued metadata) to generate a "transmit command" of the appropriate form to cause the packet to be output from the indicated destination.

For each NBI destination circuit, there is a separate 12-bit "transmit sequence number" that the NBI destination circuit uses to order packets as they are being output. For example, egress NBI(1) circuit 34 uses a first set of 12-bit "transmit sequence numbers" that are all in a first range. Egress NBI(2) circuit 37, on the other hand, uses a second set of 12-bit "transmit sequence numbers" that are all in a second range. These ranges overlap one another. The OP 15 converts the "ordering sequence number" of the packet to be released into a proper 12-bit "transmit sequence number" for the particular destination to which the packet is destined. To do this, the OP maintains a record of the last "transmit sequence number" for each egress NBI destination through which it causes packets to be output from the IB-NFP. When the OP seeks to release the next packet of the ordering context to that particular destination, the "transmit sequence number" assigned to the packet is the prior transmit sequence number plus one. In this way, the OP generates (step 114) the "transmit sequence number" that is includes in the "transmit command."

The 12-bit transmit sequence numbers apply onto the egress NBI islands. To cause transmission out of an egress PCIe island or out of an egress ILA island, further processing by other software elements is required. The OPs use hardware-managed queues to preserve the order of requests, and these requests are supplied out of the OPs to the egress PCIe and egress ILA islands from these hardware-managed queues. Thus, transmission from an egress PCIe island or from an egress ILA island does not require that the OP generate a "transmit sequence number". The particular OP that handles generating the proper form of transmit command that this island requires contains this specialized code. The hardware-managed queue is in one of the memory units.

In the case that the destination is an egress NBI island, the OP determines the 5-bit number of a "reorder queue" in the destination, where the particular "reorder queue" is the reorder queue for the "ordering context" of the packet to be released. The OP makes the 5-bit number a part of the egress packet descriptor, and uses the PPI to cause the PE to update the "egress packet descriptor" (as it is stored in the CTM) to contain this 5-bit "reorder queue" value.

FIG. 9 is a diagram that shows the various fields of a type of CPP command called a "packet complete" command. For additional information on the packet complete command, the packet engine, and how the packet engine works and handles the packet complete command, see: U.S. patent application Ser. No. 14/464,690, entitled "Packet Engine That Uses PPI Addressing", filed Aug. 20, 2014, by Salma Mirza et al. (the entire subject matter of this patent application is incorporated by reference herein).

FIG. 10 is a table that shows more detail about the various fields of the packet complete command of FIG. 9. In the case of the destination being an egress NBI circuit, the "transmit command" is a packet complete command of the format set forth in the FIG. 9 and FIG. 10. In the example of FIG. 2, OP 15 generates (step 115) this "packet complete command" and sends it to PE (step 116) that originally allocated the PPI. The OP 15 knows from the release message which particular PE it was that originally assigned the PPI. The PE and the PPI are set forth in the egress packet descriptor.

The resulting "packet complete command" as it is sent out of the OP includes, among other things: 1) the PPI number of the packet, 2) the assigned 12-bit "transmit sequence number", 3) a 5-bit number indicating the "reorder queue" in the egress device destination, and 4) an indication of the egress device destination to which the PE should forward the packet complete command. As shown in FIG. 10, the 12-bit "transmit sequence number" is spread out and is carried by three fields of the packet complete command: four bits of the data master island field, four bits of the master ID field, and four bits of the signal master field. These bits of these concatenated fields are the actual 12-bit "transmit sequence number". Note that the "ordering sequence number" is not carried by the "packet complete command".

The PE receives this "packet complete" command, and responds by forwarding (step 117) it on the egress destination. The PE also uses the PPI (from the packet complete command) to retrieve the egress packet descriptor from its memory 44, and then to send (step 118) that egress packet descriptor on to the destination. The 12-bit "transmit sequence" number is also embedded in the egress packet descriptor as part of the 32-bit "sequence number of the packet" field. Only the lower twelve bits of this 32-bit field are significant. Note that the egress packet descriptor as retrieved by the PE and as sent to the destination does not include the "ordering sequence number". A portion of the metadata may not fit within the packet complete command, so the egress NBI may actually then retrieve this information from the CTM.

Accordingly, the reordering hardware in the destination (in the egress NBI(1) circuit 34 in this example) receives: 1) a number indicating the ordering context, 2) the 12-bit "transmit sequence number", 3) a 5-bit number indicating the "reorder queue", and 4) the egress packet descriptor. The reordering hardware uses the 12-bit "transmit sequence number" to do micro reordering (step 119) on the egress packet descriptors within the ordering context. The reordering hardware maintains one dedicated "reorder queue" for each "ordering context" for this purpose. All incoming egress packet descriptors of this ordering context are all stored into this same one reorder queue. Regardless of how the egress packet descriptors are loaded into this reorder queue, the reordering hardware only takes the egress packet descriptors out of the reorder queue in the proper order (in accordance with their 12-bit "transmit sequence numbers"). By virtue of the fact that the egress packet descriptors are properly ordered with respect to the "transmit sequence numbers", the egress packet descriptors are also properly ordered with respect to the "ordering sequence numbers".

In actuality, the egress NBI's ordering is really "best effort" in extreme cases. It is possible in an extreme situation for packets to arrive at the egress NBI sufficiently out of order that the egress NBI is overloaded and forwards on the packets out of order.

Even though the packet information is sent to the egress NBI(1) circuit 34 in the proper order, there may be delays in the communication across the bus structure of the IB-NFP integrated circuit from the PE 43 to the egress NBI(1) circuit 34 such that the information as received at the egress NBI(1) circuit 34 is out of order. For example, the egress packet descriptor for a first packet may be sent from the PE 43 to the egress NBI(1) circuit 34 before the egress packet descriptor of a second packet is sent, but yet the egress packet descriptor of the second packet as received by the egress NBI(1) circuit 34 is received first. The 12-bit "transmit sequence number" is used to correct for this possible erroneous reordering.

A stream of properly ordered egress packet descriptors as output by the reordering hardware is then pushed onto one or more "scheduler queues" (also called transmit queues) of a scheduler (or traffic manager). The egress packet descriptors in a "scheduler queue" are in the proper order, one with respect to the next, so that the corresponding packet (as referenced by the egress packet descriptor) that is top on a particular scheduler queue is always the oldest packet (the first received by the IB-NFP) of all the packets identified by egress packet descriptors in that scheduler queue. More than one scheduler queue can hold egress packet descriptors of packets of a given ordering context, but a given egress packet descriptor is only put onto one of the scheduler queues. The scheduler queues are used for QoS processing, and have nothing to do with packet ordering.

The scheduler and associated egress circuitry in the egress NBI(1) circuit 34 pops its scheduler queues (step 12) in some order. The order is determined by a scheduling rule. When a scheduler queue is popped, the egress packet descriptor obtained includes information about where the header portion of the packet is stored. The DMA engine of the egress NBI(1) circuit 34 uses this information to retrieve the packet header (step 120) from the CTM memory 42 where it is stored. The egress packet descriptor also includes information about where the payload of the packet is stored in the E-MU. The DMA engine of the egress NBI(1) circuit 34 uses this information to retrieve the payload (step 121) from external DRAM 41. The resulting assembled packet passes through a packet modifier (step 122) in the egress NBI(1) circuit 34, and is output from the egress NBI(1) circuit 34. The packet then passes through the egress MAC (1) circuit 35, and through the input/output circuitry 36, and out of the IB-NFP.

FIG. 11 is a diagram that illustrates the format of another type of "transmit command" used when the destination of a packet is the PCIe(1) circuit 27. In the case of the destination being the PCIe(1) circuit 27, the transmit command is sent directly from the OP 15 to the PCIe(1) circuit 27. The format shown in the diagram is the format of the sixteen bytes of information that is sent to the PCIe transmit subsystem, which in turn then transmits the packet to a "receive queue". Transmission to the host requires further processing. This software (called "NFD") allocates host memory buffers, builds master DMA transmissions to the host, enqueues host descriptors of packet metadata, and adjusts head/tail pointers and receive queue and freelists.

In the case of the destination being an egress PCIe island, the transmit command includes the following fields in order: 1) an indicator of the CTM island where the PE is located (6 bits); 2) unused (1 bit); 3) the PPI (9 bits); 4) buffer list number (2 bits); 5) start-of-packet/end-of-packet flags (2 bits); 6) offset to the start of the packet (12 bits); 7) CTM buffer size (2 bits); 8) an indication of which of the two ingress NBIs received the packet (1 bit); an MU buffer pointer (29 bits); 10) a valid bit (1 bit); 11) the prepended metadata length (7 bits); 12) the PCIe receive queue indicator (8 bits); 13) an indicator of the total length of the packet (16 bits); 14) stripped VLAN (16 bits); and 15) packet metadata flags (16 bits). The PCIe subsystem will deliver the packet to one of sixty-four "receive queues", each of which is serviced independently by the host. Not all sixty-four "receive queues" may be in use. A queue may deliver packets to one of: 1) the host operating system, 2) the host application running in user space, 3) a virtual machine operating system; or 4) an application running in the user space of a virtual machine.

Some packets of an ordering context may be sent out of the IB-NFP via one destination, whereas other packets of the same ordering context may be sent out of the IB-NFP via another destination. The OP that handles the ordering context handles generating "transmit commands" of the appropriate format, depending on what the destination of the particular packet is. In one example, the program code for doing this is not stored in the form of many copies in the many WPs, but rather is provided only once in one OP. This architecture of the ordering system reduces the amount of memory space required to store the code for this formatting function of the ordering system, and better uses the combined processing throughput of the processors (the WPs and the OPs).

The architecture of the ordering system streamlines and simplifies the process of dequeueing and processing transmit descriptors. Without the OPs, the process of transmission would be complicated by locking mechanisms required for egress queue access, transmit sequence number assignment, and even serialization of access to ticket bitmaps. Although each ticket release is atomic, the return data is not delivered to separate WPs in order. The architecture that includes separate OPs provides uniform, serialized access for delivering packets within a set of ordering contexts.

For a general description of a transactional memory that operates with a CPP bus, see: 1) U.S. Pat. No. 8,775,686, entitled "Transactional Memory That Performs An Atomic Metering Command", by Gavin J. Stark, filed Aug. 29, 2012; and 2) U.S. Patent Publication Number 20140075147, having U.S. patent application Ser. No. 13/609,039, entitled "Transactional Memory That Performs An Atomic Look-Up, Add and Lock Operation", by Gavin J. Stark et al., filed Sep. 10, 2012 (the entire subject matter of these two patent documents is hereby incorporated by reference).

Figure 12:
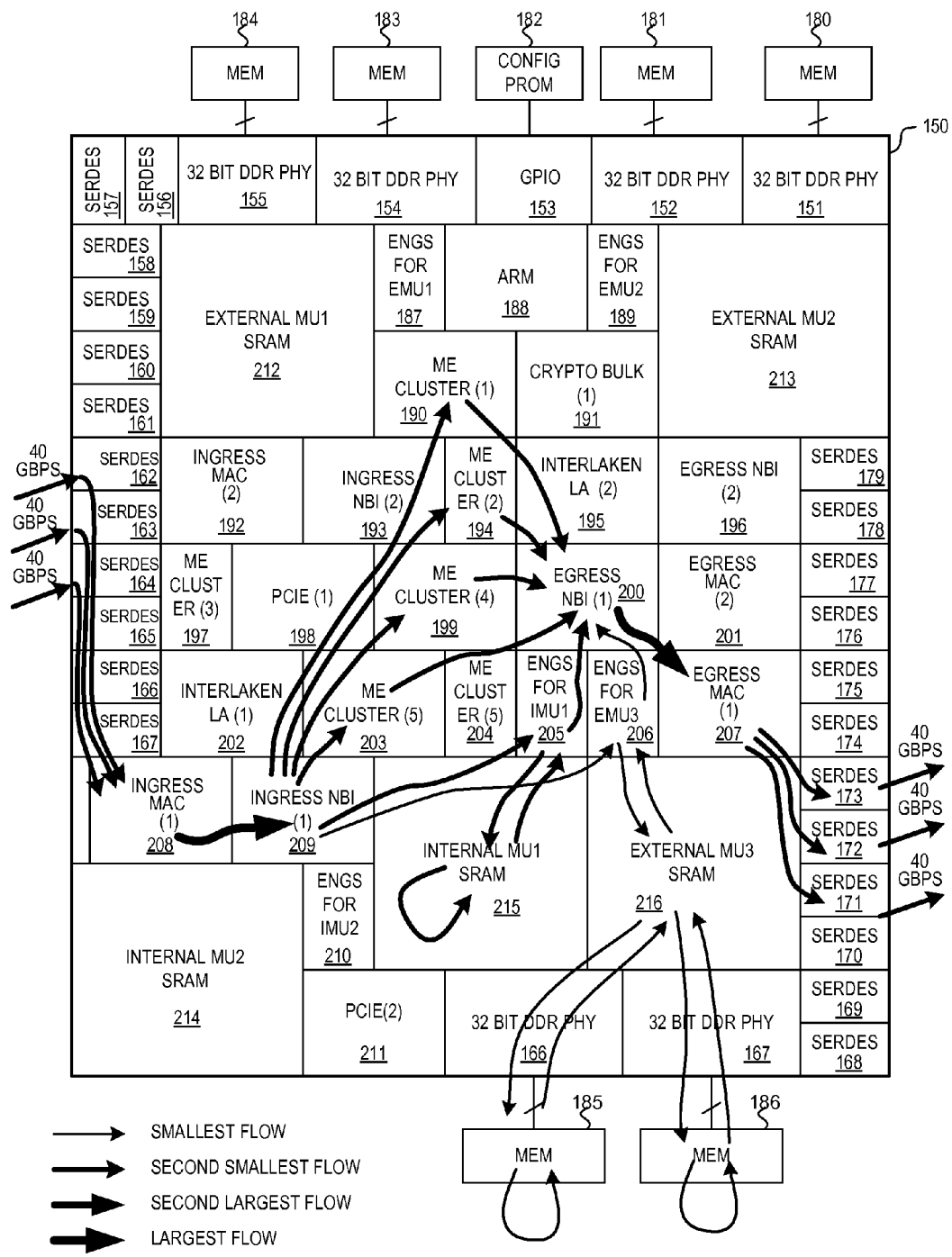
FIG. 12 is a diagram of an Island-Based Network Flow Processor (IB-NFP) integrated circuit that implements one example of the novel distributed packet ordering system.

FIGS. 12-20 illustrate an example of an IB-NFP integrated circuit 150, within which an example of the novel distributed packet ordering system is embodied in accordance with one novel aspect. FIG. 12 is a simplified top-down diagram of the IB-NFP integrated circuit 150. For more detail on the IB-NFP 150 of FIG. 12, see: U.S. Patent Publication Number 20130219091, having U.S. patent application Ser. No. 13/399,888, entitled "Island-Based Network Flow Processor Integrated Circuit", by Gavin J. Stark et al., filed Feb. 17, 2012 (the entire contents of which is hereby incorporated by reference). The IB-NFP integrated circuit 150 includes a peripheral first area of input/output circuit blocks 151-179. Each of the SerDes I/O circuit blocks 156-167 and 168-179 is duplex in that it has four 10 Gbps lanes for receiving SerDes information and it also has four 10 Gbps lanes for transmitting SerDes information. A SerDes circuit block can communicate information in both directions simultaneously. The three SerDes circuit blocks 162-164 can therefore communicate information at 120 gigabits per second in both directions. Respective ones of the DDR physical interfaces 151, 152, 154, 155, 166 and 167 are used to communicate with corresponding external memory integrated circuits 180, 181, 183, 184, 185 and 186, respectively. GPIO interface block 153 is used to receive configuration information from external PROM 182.

In addition to the first peripheral area of I/O blocks, the IB-NFP integrated circuit 150 also includes a second tiling area of islands 187-211. Each of these islands is either a full rectangular shape, or is half the size of the full rectangular shape. For example, the island 192 is a full island. The island 197 is a half island. The functional circuits in the various islands of this second tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern. In the case of the CPP data bus, as described in further detail below, functional circuitry in one island can use the CPP data bus to send a command to functional circuitry in another island, to read data from functional circuitry in another island, or a write data to functional circuitry in another island.

In addition to the second tiling area, there is a third area of larger sized blocks 212-216. The mesh bus structures do not extend into or over any of these larger blocks. The functional circuitry of a larger sized block may connect by direct dedicated connections to an interface island within the tiling area and through this interface island achieve connectivity to the mesh buses and other islands.

In the packet flow operation illustrated in FIG. 12, packet traffic is received into three SerDes blocks 162-164. The packet data in this particular example passes through dedicated connections from three SerDes circuit blocks 162-164 to the ingress MAC island 208 and then to the ingress NBI (Network Bus Interface) island 209. A picoengine pool with the ingress NBI island 209 performs a hash function on the incoming packets, and generates preclassification results for each packet. The packets are spread out to be processed by various worker microengines (or "Worker Processors" (WPs)) disposed in various ME islands 203, 199, 194 and 190. For each packet, the payload portion of the packet is generally stored either in internal SRAM block 215, or in external DRAMs 185 and 186. An ingress packet descriptor and a header portion of the packet is passed to the WP via a packet engine (the packet engine may, for example, be located in the CTM of the ME island containing one of the worker microengines). The WP then uses the header portion and the ingress packet descriptor to perform application layer processing on the packet.

When WP completes its application layer processing of the packet, it sends a release request to the distributed packet ordering system. In one example, this release request is a function call to an amount of local "library code" being executed by the WP. The library code is actually stored in a local shared memory that the WP shares with one other neighboring ME. Execution of the library code results in an atomic ticket release command being sent to a transactional memory 205 and 215 that maintains a ticket release bitmap for the ordering context. The transactional memory returns "return data", that the library code then uses to issue a "release message" to an Output Processor (OP). The OP is another ME, that may be located in yet another ME island. The OP outputs a "transmit command" to the packet engine (PE) such that the header portion and an egress packet descriptor are passed to an intended destination of the packet. In the example of FIG. 12, the packet is passed to egress NBI(1) island 200. The egress NBI(1) island 200 performs hardware reordering, and supplies the packets (in the form of a egress packet descriptors) in a kind of stream into a scheduling queue or queues. Other circuits on the egress NBI(1) island 200 then perform scheduling, and packet modification, on the packets, and the resulting modified packets are passed from egress NBI(1) island 200 and to egress MAC island 207. Egress MAC island 207 buffers the packets, and converts them into symbols. The symbols are then delivered by dedicated conductors from the egress MAC island 207 to three SerDes circuit blocks 171-173 and out of the IB-NFP integrated circuit 150. Packets of a given "ordering context" are therefore processed by WPs located in multiple ME islands 190, 194, 199 and 203. After application layer processing, these packets can be made to be output from the IB-NFP by one or a smaller number of destinations.

Figure 13:
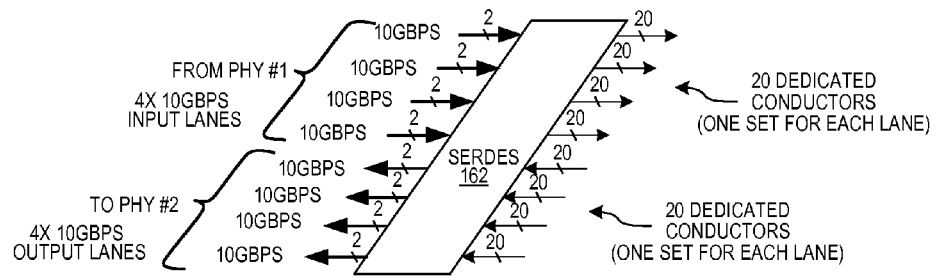
FIG. 13 is a diagram of one of the SerDes circuit blocks in the IB-NFP of FIG. 12.

FIG. 13 is a more detailed diagram of one of the SerDes circuit blocks 162.

Figure 14:
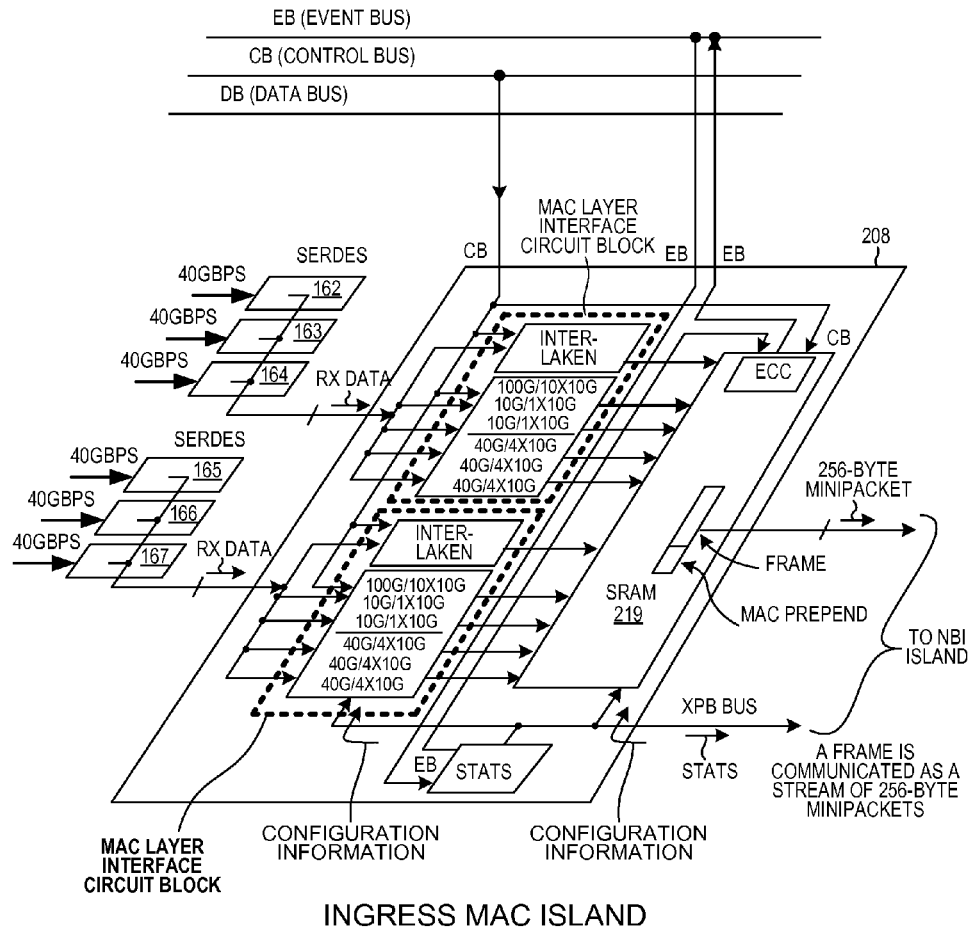
FIG. 14 is a diagram of one of the ingress MAC islands 208 in the IB-NFP of FIG. 12.

FIG. 14 is a more detailed diagram of one of the ingress MAC islands 208. The ingress MAC island 208 receives packet data from six SerDes circuit blocks 162-167.

Figure 15:
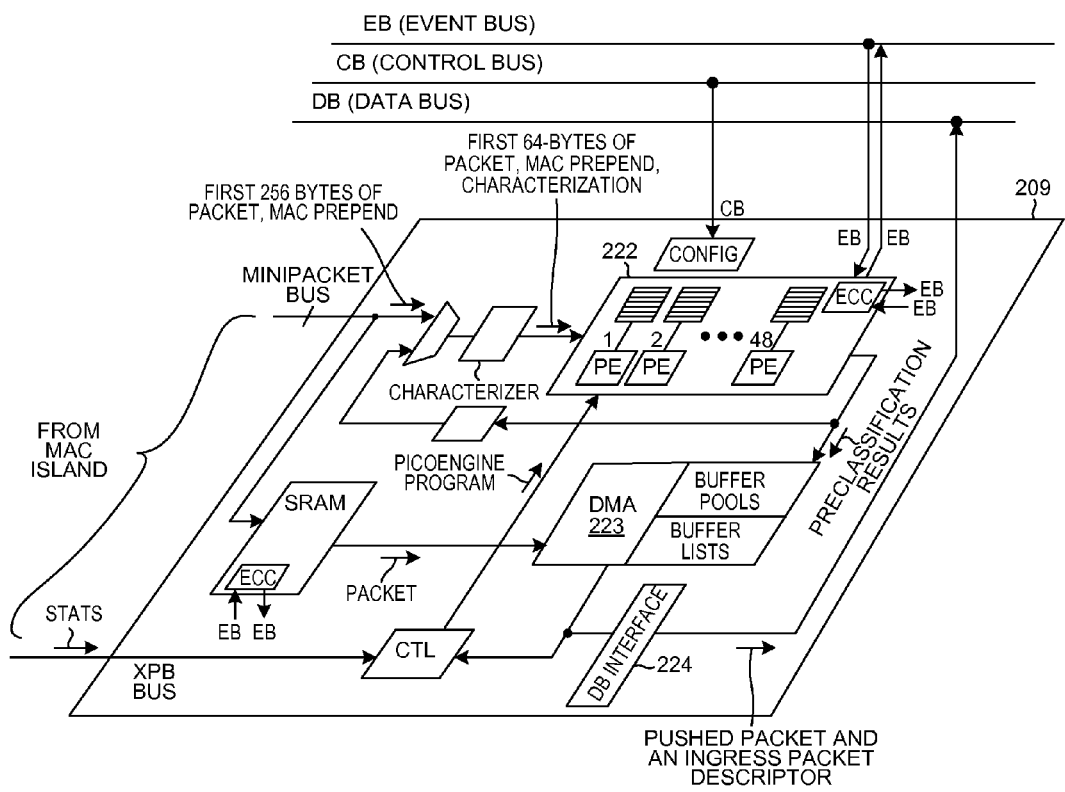
FIG. 15 is a diagram of one of the ingress NBI islands 209 in the IB-NFP of FIG. 12.

FIG. 15 is a more detailed diagram of one of the ingress NBI islands 209. The island 209 includes a picoengine pool 222, a DMA engine 223, and a DB interface 224 for interfacing with the CPP data bus. Eight counters that generate "input sequence numbers" are located in the picoengine pool 222. The DMA engine 223 causes the initial portion of the packet (for example, the header portion) and the ingress packet descriptor to be stored in a CTM in accordance with buffer pool information. The DMA engine 223 causes the payload portion to be stored in memory (for example, external DRAM) in accordance with buffer list information.

Figure 16:
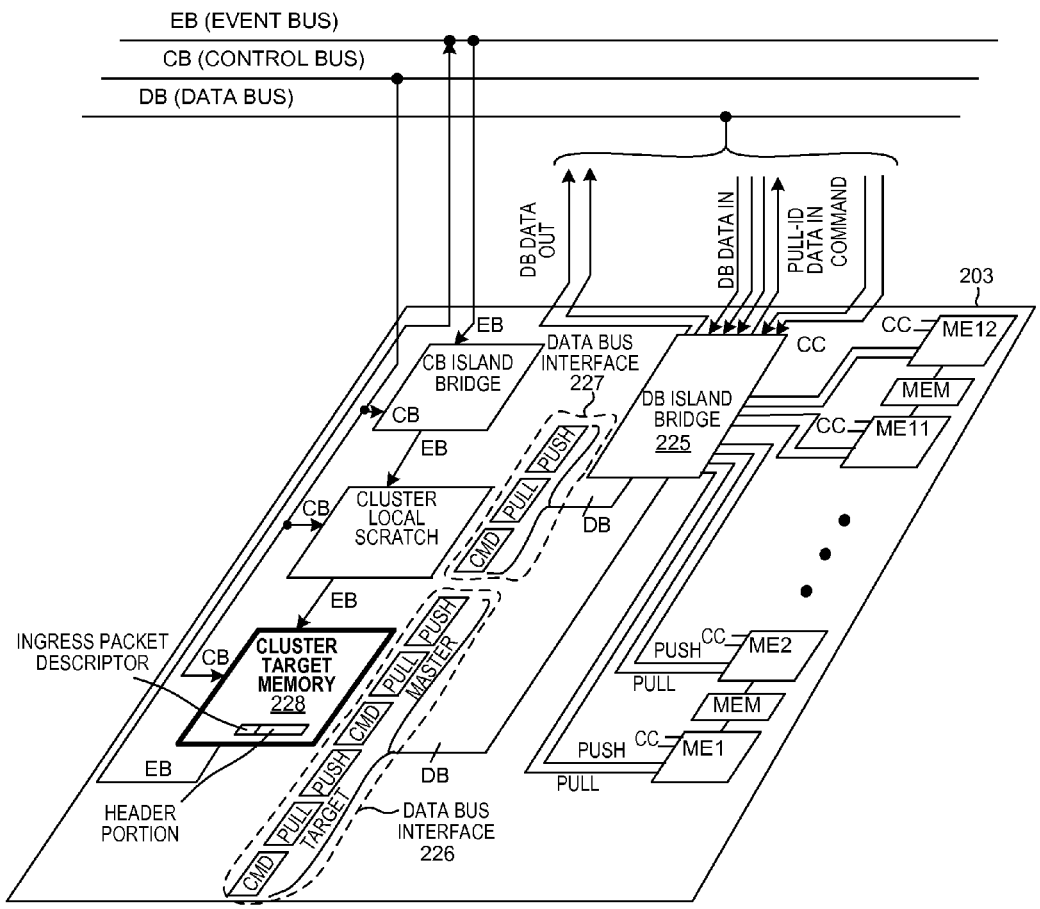
FIG. 16 is a diagram of an ME island in the IB-NFP of FIG. 12.

FIG. 16 is a more detailed diagram of one of the ME islands 203. The island includes twelve ME processors ME1-ME12, a DB island bridge 225 and DB interface circuits 226-227, and a Cluster Target Memory 228.

Figure 17:
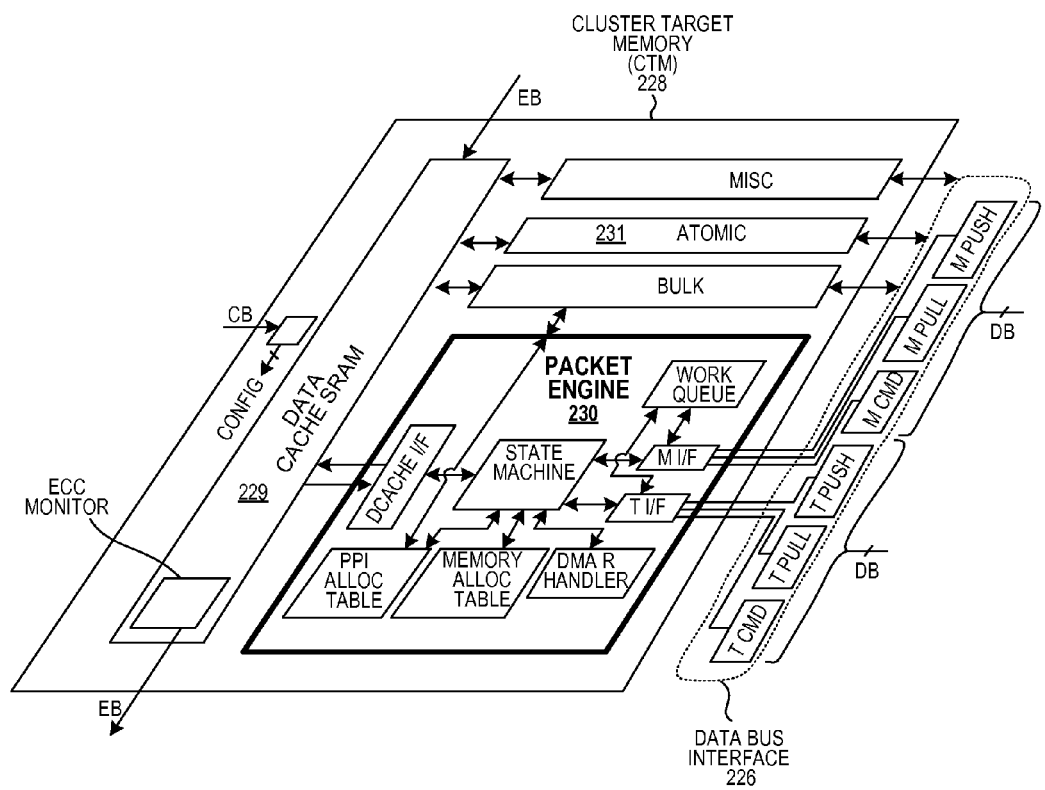
FIG. 17 is a diagram of the CTM (Cluster Target Memory) in the ME island of FIG. 16.

FIG. 17 is a more detailed diagram of the CTM 228 in ME island 203. The CTM 228 includes an amount of memory 229, a packet engine (PE) 230, and an Atomic Engine (AE) 231. The CTM 228 is one type of transactional memory on the IB-NFP that has the atomic ticket release functionality described above.

Figure 18:
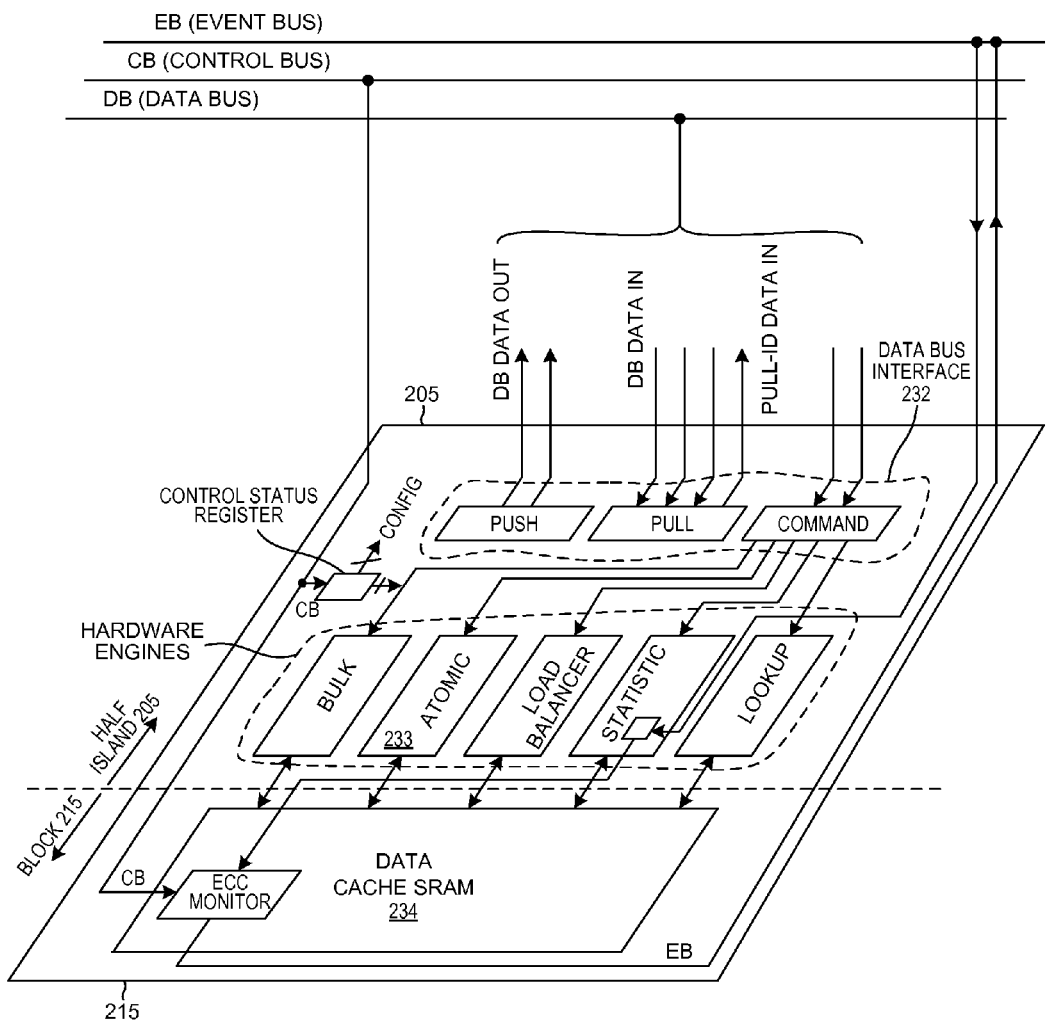
FIG. 18 is a diagram of an MU (Memory Unit) island in the IB-NFP of FIG. 12.

FIG. 18 is a more detailed diagram of one of the MU islands 205 and its companion SRAM block 215. The MU island/SRAM island pair is a transactional memory that has the atomic ticket release functionality. The MU island/SRAM island pair includes, among other things, a CPP data bus interface 232, an Atomic Engine (AE) 233, and data cache SRAM 234. The E-MU island 206 is of identical construction to the I-MU island 205, except that the E-MU island 206 has no associated memory companion SRAM block within the IB-NFP but rather has a companion memory in the form of external DRAM 185,186.

Figure 19:
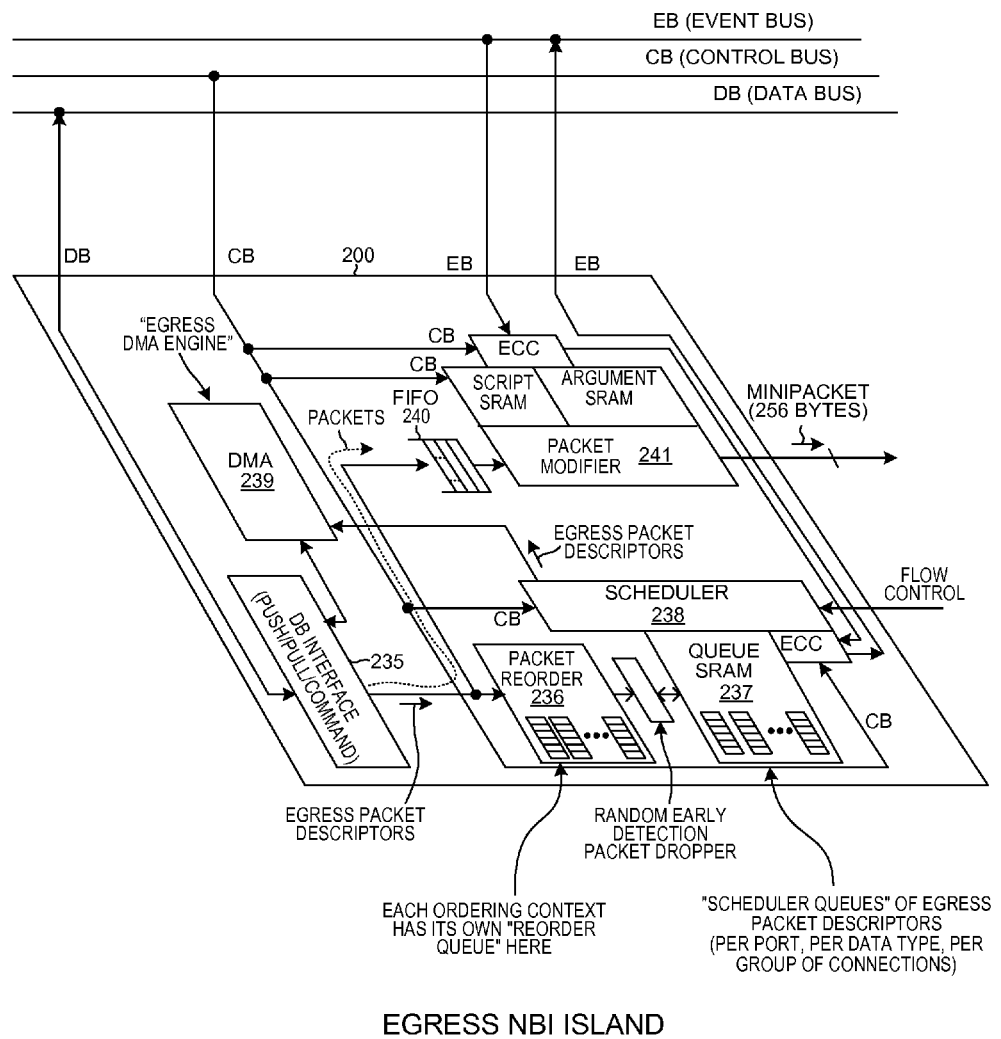
FIG. 19 is a diagram of one of the egress NBI islands 200 in the IB-NFP of FIG. 12.

FIG. 19 is a more detailed diagram of one of the egress NBI islands 200. The egress NBI(1) island 200 includes a DB interface 235 for interfacing with the CPP data bus, a hardware packet reorder block 236, a scheduler queue SRAM 237, a scheduler 238, a DMA engine 239, an output FIFO 240, and a packet modifier 241. The hardware packet reorder block 236 is the block that performs micro ordering based on "transmit sequence numbers" as described above, and outputs a stream (of egress packet descriptors) where the indicated packets (as indicated by egress packet descriptors in the stream) are in the same order that they were in when they were received onto the IB-NFP.

Figure 20:
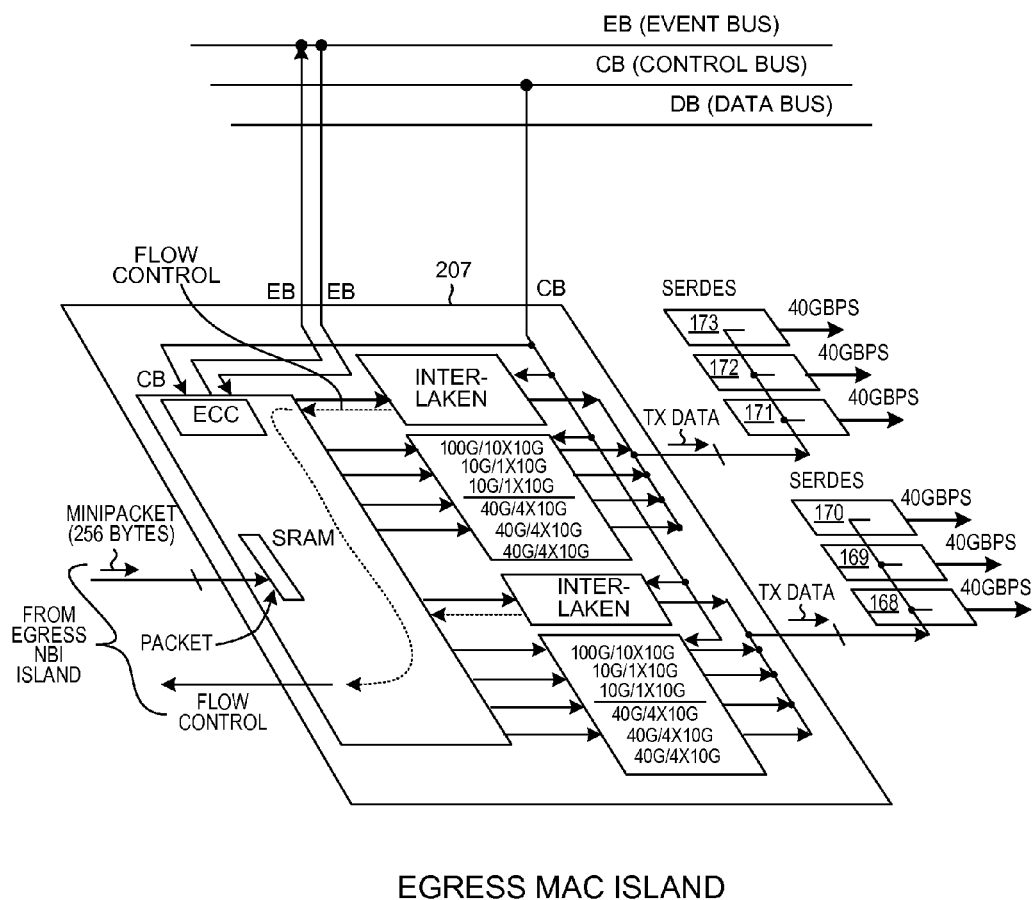
FIG. 20 is a diagram of one of the egress MAC islands 207 in the IB-NFP of FIG. 12.

FIG. 20 is a more detailed diagram of one of the egress MAC islands 207. The egress MAC island 207 outputs packets via six SerDes circuit blocks 173-168.

Figure 21:
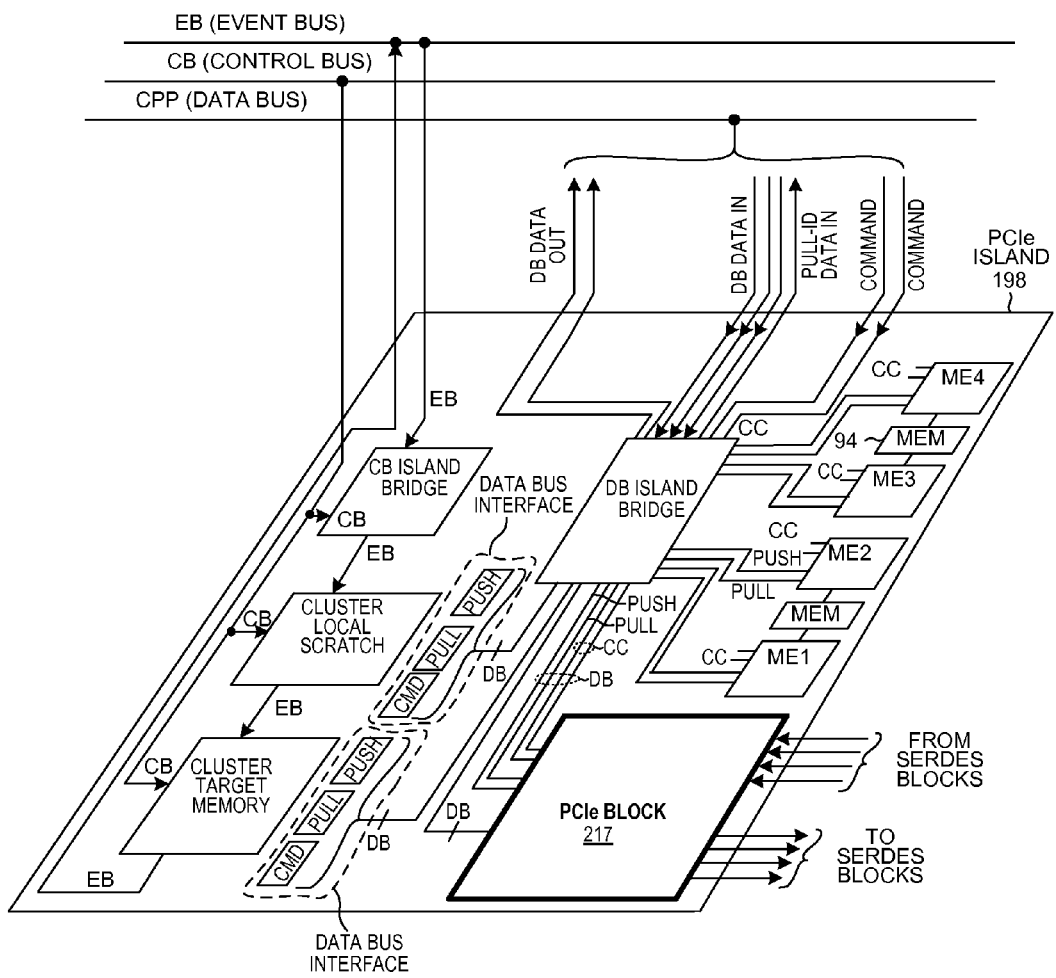
FIG. 21 is a diagram of one of the PCIe islands in the IB-NFP of FIG. 12.

FIG. 21 is a diagram of the PCIe island 198 in the IB-NFP 150 of FIG. 12. The PCIe island 198 has the same general structure as an ME island, except that the PCIe island includes a PCIe block 217.

Figure 22:
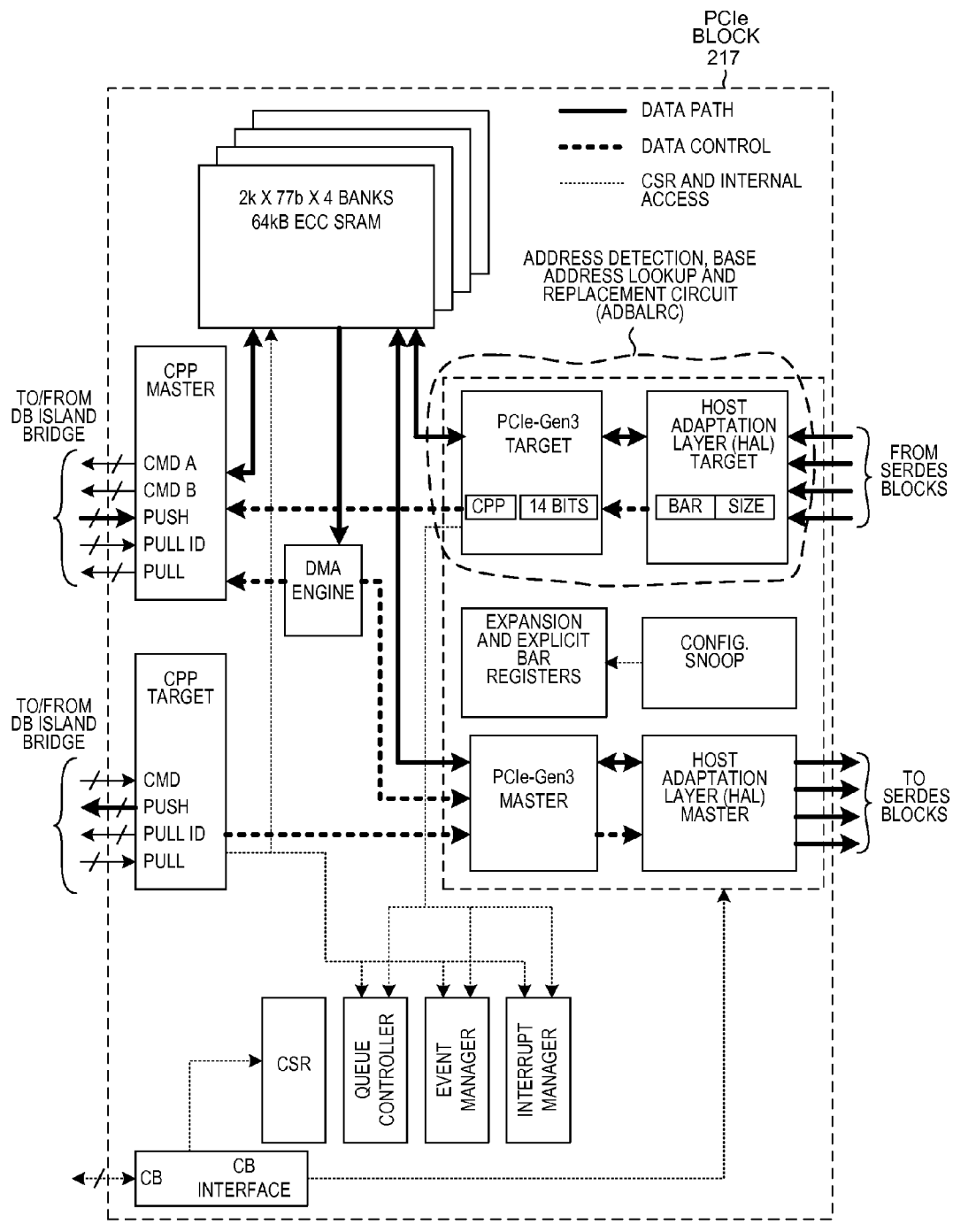
FIG. 22 is a diagram of the PCIe block within the PCIe island of FIG. 21.

FIG. 22 is a diagram of the PCIe block 217 in the PCIe island 198 of FIG. 21. For additional detail on the structure and operation of the PCIe island 198 and PCIe block 217, see: U.S. patent application Ser. No. 14/172,844, entitled "Network Interface Device That Maps Host Bus Writes Of Configuration Information For Virtual NIDs Into A Small Transactional Memory", filed Feb. 4, 2014, by Gavin J. Stark et al. (the entire subject matter of which is incorporated herein by reference).

Figure 23:
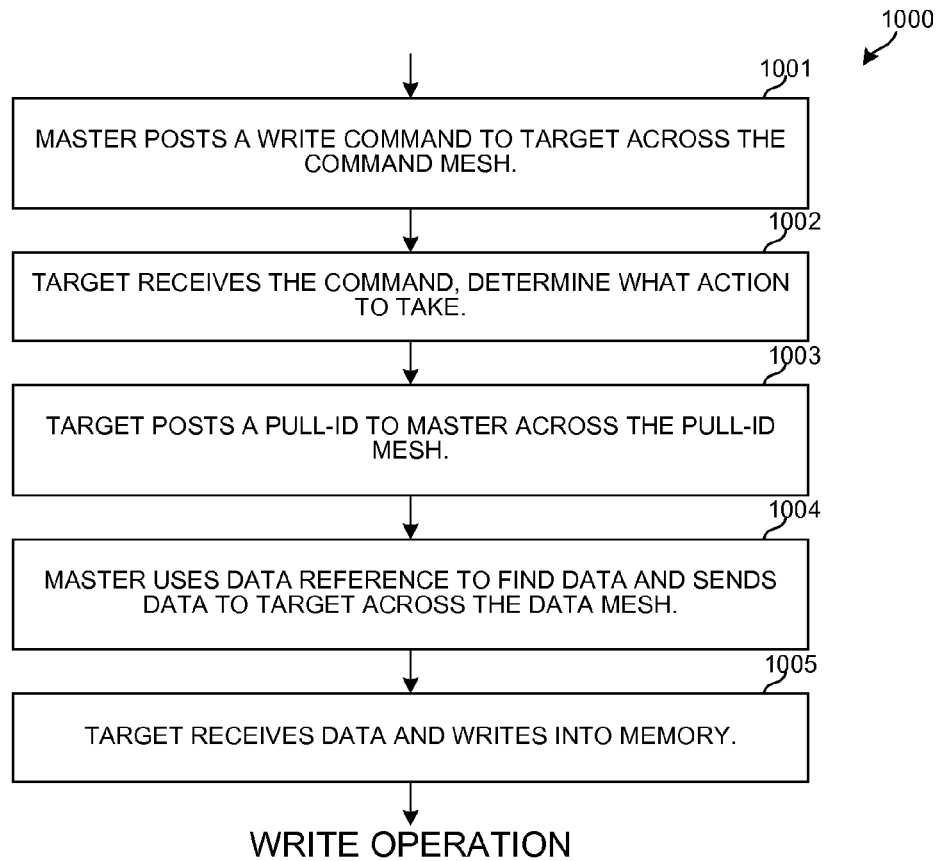
FIG. 23 is a flowchart that illustrates steps involved in a CPP write operation.

CCP Data Bus Operation: Operation of the Command/Push/Pull data bus of the IB-NFP is described below in connection with FIGS. 23-30. The CPP data bus includes four "meshes": a command mesh, a pull-id mesh, and two data meshes data0 and data1. FIG. 23 is a flowchart of a write operation method 1000 that might occur across the configurable mesh CPP data bus. In a first step (step 1001), certain functional circuitry in one of the islands uses its data bus interface to output a bus transaction value onto the configurable mesh CPP data bus. This functional circuitry is referred to as the "master" of the write operation. The format of the bus transaction value is as set forth in FIG. 24. A bus transaction value 1006 includes a metadata portion 1007 and a payload portion 1008 as shown. The metadata portion 1007 includes a final destination value 1009 and a valid bit 1010. In the case of the bus transaction value being a command, the payload is of the form shown in FIG. 25.

The bus transaction value in this case is a write command to write data into functional circuitry in another island. The functional circuitry that receives the bus transaction value and the data to be written is referred to as the "target" of the write operation. The write command is said to be "posted" by the master circuit onto the command mesh. As indicated in FIG. 24, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master circuit to the appropriate target circuit. All bus transaction values on the data bus that originate from the same island that have the same final destination value will traverse through the configurable mesh data bus along the same one path all the way to the indicated final destination island.

A final destination island may have more than one potential target circuit. The 4-bit target field of payload portion indicates which one of these targets in the destination island it is that is the target of the command. The 5-bit action field of the payload portion indicates that the command is a write. The 14-bit data reference field is a reference usable by the master circuit to determine where in the master the data is to be found. The address field indicates an address in the target where the data is to be written. The length field indicates the amount of data.

In a next step (step 1002) in the method 1000 of FIG. 23, the target circuit receives the write command from the command mesh and examines the payload portion of the write command. From the action field the target circuit determines that it is to perform a write action. To carry out this action, the target circuit writes (i.e., posts) a bus transaction value (step 1003) called a pull-id onto the pull-id mesh. The pull-id is also of the format indicated in FIG. 24. The payload portion of the pull-id is of the format set forth in FIG. 26. The final destination field of the metadata portion of the pull-id indicates the island where the master circuit is located. The target port field identifies which sub-circuit target it is within the target's island that is the target circuit of the command. The pull-id is communicated through the pull-id mesh back to the master circuit.

The master circuit receives the pull-id from the pull-id mesh and uses the content of the data reference field of the pull-id to find the data. In the overall write operation, the master circuit knows the data it is trying to write into the target circuit. The data reference value that is returned with the pull-id is used by the master circuit as a flag to match the returning pull-id with the write operation the master circuit had previously initiated.

The master circuit responds by sending (step 1004) the identified data to the target across one of the data meshes data0 or data1 as a "pull" data bus transaction value. The term "pull" means that the data of the operation passes from the master to the target. The term "push" means that the data of the operation passes from the target to the master. The format of the "pull" data bus transaction value sent in this sending of data is also as indicated in FIG. 24. The format of the payload portion in the case of the payload being pull data is as set forth in FIG. 28. The first bit of the payload portion is asserted. This bit being a digital high indicates that the transaction is a data pull as opposed to a data push. The target circuit then receives (step 1005) the data pull bus transaction value across the data1 or data0 mesh. The target circuit writes the content of the data field (the data field of FIG. 28) of the pull data payload portion into target memory at the appropriate location indicated by the address field of the original write command.

Figure 30:
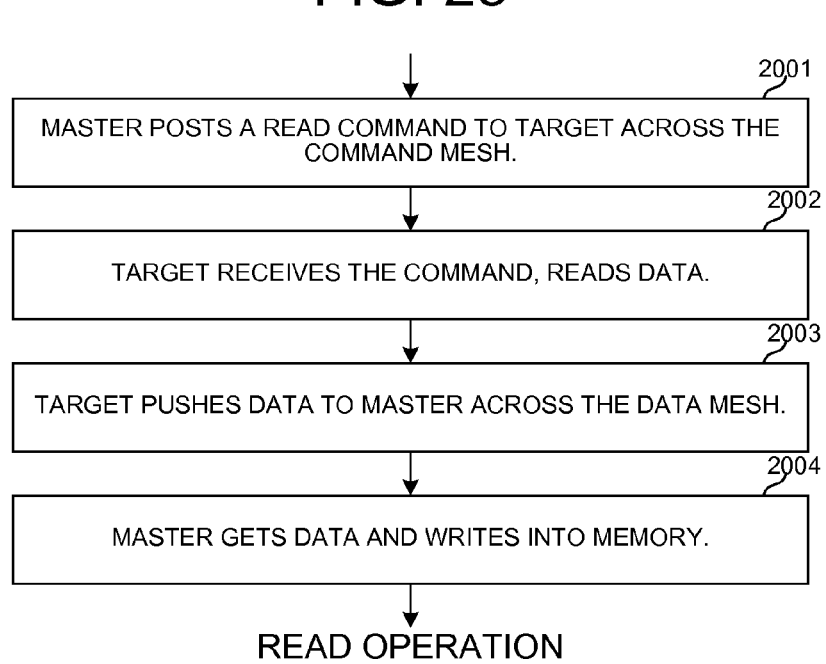
FIG. 30 is a flowchart that illustrates steps involved in a CPP read operation.

FIG. 30 is a flowchart of a read operation method 2000 that might occur across the configurable mesh CPP data bus. In a first step (step 2001), a master circuit in one of the islands uses its data bus interface to output (to "post") a bus transaction value onto the command mesh bus of the configurable mesh CPP data bus. In this case, the bus transaction value is a read command to read data from a target circuit. The format of the read command is as set forth in FIGS. 24 and 25. The read command includes a metadata portion and a payload portion. The metadata portion includes the 6-bit final destination value that indicates the island where the target is located. The action field of the payload portion of the read command indicates that the command is a read. The 14-bit data reference field is usable by the master circuit as a flag to associated returned data with the original read operation the master circuit previously initiated. The address field in the payload portion indicates an address in the target where the data is to be obtained. The length field indicates the amount of data.

The target receives the read command (step 2002) and examines the payload portion of the command. From the action field of the command payload portion the target circuit determines that it is to perform a read action. To carry out this action, the target circuit uses the address field and the length field to obtain the data requested. The target then pushes (step 2003) the obtained data back to the master circuit across data mesh data1 or data0. To push the data, the target circuit outputs a push bus transaction value onto the data1 or data0 mesh. FIG. 29 sets forth the format of the payload portion of this push bus transaction value. The first bit of the payload portion indicates that the bus transaction value is for a data push, as opposed to a data pull. The master circuit receives the bus transaction value of the data push (step 2004) from the data mesh bus. The master circuit then uses the data reference field of the push bus transaction value to associate the incoming data with the original read command, and from the original read command determines where the pushed data (data in the date field of the push bus transaction value) should be written into the master circuit. The master circuit then writes the content of the data field of the data field into the master's memory at the appropriate location. For a general description of the Command/Push/Pull data bus of the IB-NFP, and its four meshes, see: U.S. Patent Publication Number 20130219103, having U.S. patent application Ser. No. 13/399,324, entitled "Configurable Mesh Data Bus In An Island-Based Network Flow Processor", filed Feb. 17, 2012, by Gavin J. Stark (all the subject matter of which is hereby incorporated by reference).

Each of the atomic ticket release commands described above in connection with the method of FIG. 2 is a CPP bus command. In the command bus transaction value of the atomic ticket release CPP bus command, the 5-bit action field is "01011" and the 2-bit token field is "00". These two fields (see FIG. 25) together identify the command as an atomic ticket release command. The address that identifies the start of the particular ticket release bitmap to be used is carried in the 40-bit field of the command bus transaction value. The "result data" that is returned by the transactional memory in response to the atomic ticket release CPP command is returned in the 64-bit data field (see FIG. 27) of a data payload bus transaction value. As in an ordinary CPP bus transaction, the data payload is returned on one of the data meshes of the CPP data bus.

Although certain specific embodiments are described above for instructional purposes, the teachings of this patent document have general applicability and are not limited to the specific embodiments described above. A transactional memory that implements the atomic ticket release command functionality can be implemented by specifying the above-described functions of the circuit in a hardware description language (such as CDL, or Verilog, or VHDL), and then supplying that hardware description language code into a commercially available hardware synthesizer program such that the program then outputs layout data for making a hardware circuit that performs the specified functions. In one example, a single ticket release bitmap is implemented as a plurality of ticket release bitmap blocks that are chained together as set forth in: U.S. patent application Ser. No. 14/579,458, entitled "Ordering System That Employs Chained Ticket Release Bitmap Block Functions", filed Dec. 22, 2014, by Christopher A. Telfer (all the subject matter of which is hereby incorporated by reference). Accordingly, various modifications, adaptations, and combinations of various features of the described embodiments can be practiced without departing from the scope of the invention as set forth in the claims.

What is claimed is:

1. A network flow processor integrated circuit comprising:
an ingress circuit that receives packets of a plurality of flows and applies a hash function to the packets, wherein a first set of the flows belongs to a first ordering context, wherein a second set of the flows belongs to a second ordering context;
a plurality of Worker Processors (WPs), wherein more than one WP receives packets of the first ordering context, wherein each WP that receives packets of the first ordering context: 1) causes metadata of each packet of the first ordering context to be stored in a memory in association with a sequence number of the packet, 2) issues release requests to release packets of the first ordering context, and 3) issues release messages to release packets of the first ordering context;
a plurality of Output Processors (OPs), wherein one and only one of the OPs handles generating transmit commands to transmit packets of the first ordering context, wherein another of the OPs handles generating transmit commands to transmit packets of the second ordering context, wherein said one OP: 1) receives release messages to release packets of the first ordering context, wherein the release messages are received from multiple ones of the WPs, 2) retrieves metadata of the packets that was stored in the memory, 3) uses the metadata retrieved to generate first transmit commands to transmit packets of the first ordering context, and 4) uses the metadata retrieved to generate second transmit commands to transmit packets of the first ordering context, wherein the first transmit commands have a format, wherein the second transmit commands have a format, and wherein the format of the first transmit commands is different than the format of the second transmit commands;
a first egress circuit that receives the first transmit commands from said one OP to transmit packets of the first ordering context; and
a second egress circuit that receives the second transmit command from the said one OP to transmit packets of the first ordering context.

2. The network flow processor integrated circuit of claim 1, wherein the multiple ones of the WPs perform application layer processing on the packets of the first ordering context, wherein the OP that handles generating transmit commands to transmit packets of the first ordering context does not perform any application layer processing on any packet of the first ordering context.

3. The network flow processor integrated circuit of claim 1, further comprising:
a transactional memory that maintains a ticket release bitmap for the first ordering context, and wherein each of the multiple ones of the WPs uses the same ticket release bitmap to determine whether a packet identified by a release request can be indicated as to be released in a release message.

4. The network flow processor integrated circuit of claim 1, wherein the first egress circuit is adapted to communicate packets out of the integrated circuit to a network without passing through a host computer, and wherein the second egress circuit is adapted to communicate packets out of the integrated circuit to the host computer.

5. The network flow processor integrated circuit of claim 1, wherein the ingress circuit determines an ordering context to which each packet received onto the ingress circuit belongs.

6. The network flow processor integrated circuit of claim 1, wherein one of the WPs determines the ordering context to which each packet belongs.

7. The network flow processor integrated circuit of claim 1, wherein each packet of the first ordering context is stamped with an ordering context sequence number, and wherein an OP converts a first of the ordering context sequence numbers into a first transmit sequence number and includes the first transmit sequence number into one of the first transmit commands sent to the first egress circuit, and wherein the OP converts a second of the ordering context sequence numbers into a second transmit sequence number and includes the second transmit sequence number into one of the second transmit commands sent to the second egress circuit.

8. The network flow processor integrated circuit of claim 7, wherein the first transmit sequence number indicates an ordering position of a packet passing through the first egress circuit with respect to other packets of the first ordering context that are passing through the first egress circuit, and wherein the second transmit sequence number indicates an ordering position of a packet passing through the second egress circuit with respect to other packets of the first ordering context that are passing through the second egress circuit.

9. The network flow processor integrated circuit of claim 1, wherein each packet of the first ordering context is stamped with an ordering context sequence number that identifies an ordering position of the packet with respect to other packets of the first ordering context, and wherein the packets of the first ordering context that are indicated as to be released by the release messages are indicated to be released in order in accordance with their ordering context sequence numbers.

10. The network flow processor integrated circuit of claim 1, wherein the first transmit commands identify an order of packets to be transmitted by the first egress device by referencing first transmit sequence numbers, wherein the first transmit sequence numbers are numbers in a first range, wherein the second transmit commands identify an order of packets to be transmitted by the second egress device by referencing second transmit sequence numbers, wherein the second transmit sequence numbers are numbers in a second range, and wherein the first and second ranges overlap one another.

11. The network flow processor integrated circuit of claim 1, wherein for each packet of the first ordering context the ingress circuit generates metadata associated with the packet.

12. The network flow processor integrated circuit of claim 1, wherein there are more than one hundred WPs, and wherein there are fewer than twenty five OPs, wherein none of the WPs generates a transmit command in response to receiving a release message, and wherein none of the OPs generates a release message.

13. The network flow processor integrated circuit of claim 1, wherein each packet of the packets that are received by the WPs is taken from the group consisting of: a packet descriptor, a packet header, a packet header and a packet payload, a packet header and a portion of a packet payload.

14. A method comprising:
(a) receiving packets of a plurality of flows onto an integrated circuit, wherein the integrated circuit comprises a first Worker Processor (WP), a second WP, an Output Processor (OP), a first egress circuit, and a second egress circuit;
(b) assigning the packets of some but not all of the flows into an ordering context, wherein each packet of the ordering context is assigned a corresponding ordering sequence number, wherein a first of the packets of the ordering context is assigned a first ordering sequence number, wherein a second of the packets of the ordering context is assigned a second ordering sequence number, and wherein the second ordering sequence number is the next number in sequence following the first ordering sequence number;
(c) performing application layer processing on the first of the packets in the first WP;
(d) after the application layer processing of (c) issuing a first release request for the first of the packets, wherein the first release request is issued by the first WP;
(e) performing application layer processing on the second of the packets in the second WP;
(f) after the application layer processing of (e) issuing a second release request for the second of the packets, wherein the second release request is issued by the second WP, wherein the second release request is issued by the second WP before the first release request is issued by the first WP;
(g) issuing one or more release messages to release the first of the packets and then the second of the packets even though the second release request was issued by the second WP before the first release request was issued by the first WP;
(h) receiving the one or more release messages of (g) onto the OP, wherein the OP performs no application layer processing on any packet of the ordering context, and wherein neither of the first and second WPs generates any transmit command to transmit any packet of the ordering context out of the integrated circuit;
(i) generating a first transmit command to transmit the first packet out of the integrated circuit via the first egress circuit, wherein the first transmit command has a first format;
(j) causing the first transmit command to be sent to the first egress circuit;
(k) generating a second transmit command to transmit the second packet out of the integrated circuit via the second egress circuit, wherein the second transmit command has a second format, and wherein the first format is different from the second format; and
(l) causing the second transmit command to be sent to the second egress circuit.

15. The method of claim 14, wherein one of the first and second egress circuits is adapted to communicate packets out of the integrated circuit to a network without passing through a host computer, and wherein the other of the first and second egress circuits is adapted to communicate packets out of the integrated circuit to the host computer.

16. The method of claim 14, wherein the first release request is sent from the first WP to a transactional memory, wherein the second release request is sent from the second WP to the transactional memory, wherein the transactional memory is a part of the integrated circuit, and wherein the transactional memory maintains a ticket release bitmap for the ordering context.

17. The method of claim 14, wherein (i) involves using the first ordering sequence number to generate a first transmit sequence number, wherein the first transmit sequence number is a part of the first transmit command, and wherein (k) involves using the second ordering sequence number to generate a second transmit sequence number, wherein the second transmit sequence number is a part of the second transmit command.

18. The method of claim 17, wherein the first transmit sequence number is a sequence number in a first range, wherein the second transmit sequence number is a sequence number in a second range, and wherein the first and second ranges overlap one another.

19. The method of claim 14, wherein the integrated circuit comprises more than one hundred WPs that perform application layer processing on packets, and wherein the integrated circuit comprise fewer than twenty five OPs, wherein none of the WPs generates a transmit command in response to receiving a release message, and wherein none of the OPs generates a release message.

20. A method comprising:
(a) receiving packets of a plurality of flows onto an integrated circuit, wherein the integrated circuit comprises a first Worker Processor (WP), a second WP, an Output Processor (OP), a first egress circuit, and a second egress circuit;
(b) assigning the packets of some but not all of the flows into an ordering context, wherein each packet of the ordering context is assigned a corresponding ordering sequence number, wherein the ordering sequence number is not a part of the packet as the packet is received in (a) onto the integrated circuit;
(c) performing application layer processing on a first packet of the packets assigned to the ordering context, wherein the processing of (c) is performed by the first WP;
(d) after the application layer processing of (c) issuing a first release request for the first packet, wherein the first release request is issued by the first WP;
(e) performing application layer processing on a second packet of the packets assigned to the ordering context, wherein the processing of (e) is performed by the second WP;
(f) after the application layer processing of (e) issuing a second release request for the second packet, wherein the second release request is issued by the second WP;
(g) issuing one or more release messages to release the first packet and then the second packet;
(h) receiving the one or more release messages of (g) onto the OP, wherein neither of the first and second WPs generates any transmit command to transmit any packet of the ordering context out of the integrated circuit;
(i) generating a first transmit command to transmit the first packet out of the integrated circuit via the first egress circuit, wherein the first transmit command has a first format, wherein the first transmit command is generated by the OP;
(j) causing the first transmit command to be sent to the first egress circuit;
(k) generating a second transmit command to transmit the second packet out of the integrated circuit via the second egress circuit, wherein the second transmit command has a second format, wherein the first format is different from the second format, and wherein the second transmit command is generated by the OP; and
(l) causing the second transmit command to be sent to the second egress circuit.

* * * * *